United States Patent
Takahashi et al.

(10) Patent No.: US 11,134,480 B2
(45) Date of Patent: *Sep. 28, 2021

(54) USER APPARATUS AND UPLINK CONTROL INFORMATION BIT WIDTH DETERMINATION METHOD

(71) Applicant: NTT DOCOMO, INC., Tokyo (JP)

(72) Inventors: Hideaki Takahashi, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/414,984

(22) Filed: May 17, 2019

(65) Prior Publication Data

US 2019/0274135 A1   Sep. 5, 2019

Related U.S. Application Data

(63) Continuation of application No. 15/567,715, filed as application No. PCT/JP2016/068728 on Jun. 23, 2016, now Pat. No. 10,341,996.

(30) Foreign Application Priority Data

Jun. 26, 2015 (JP) .................................. 2015-129326

(51) Int. Cl.
*H04W 72/04* (2009.01)
*H04W 8/24* (2009.01)
(Continued)

(52) U.S. Cl.
CPC ...... *H04W 72/0413* (2013.01); *H04B 7/0413* (2013.01); *H04B 7/0647* (2013.01);
(Continued)

(58) Field of Classification Search
None
See application file for complete search history.

(56) References Cited

U.S. PATENT DOCUMENTS

| | | | |
|---|---|---|---|
| 2011/0243079 A1* | 10/2011 | Chen | H04B 7/0639 370/329 |
| 2013/0176929 A1* | 7/2013 | Yang | H04L 1/1861 370/311 |

(Continued)

FOREIGN PATENT DOCUMENTS

| | | |
|---|---|---|
| JP | 2011-142570 A | 7/2011 |
| WO | 2014/110807 A1 | 7/2014 |

OTHER PUBLICATIONS

International Search Report issued in corresponding application No. PCT/JP2016/068728 dated Sep. 6, 2016 (5 pages).

(Continued)

*Primary Examiner* — Saumit Shah
(74) *Attorney, Agent, or Firm* — Osha Bergman Watanabe & Burton LLP

(57) ABSTRACT

A user apparatus that perform communication with a base station in a mobile communication system is disclosed. The user apparatus includes a transmitter that transmits capability information of the user apparatus to a base station, a receiver that receives configuration information from the base station, and a processor that determines a bit width of a rank indicator based on a maximum number of Multiple-Input Multiple-Output (MIMO) layers. Further, the configuration information received from the base station includes a parameter indicating a transmission mode and the maximum number of MIMO layers.

2 Claims, 28 Drawing Sheets

(51) Int. Cl.
　　　H04W 16/28　　(2009.01)
　　　H04B 7/06　　(2006.01)
　　　H04B 7/0413　(2017.01)
　　　H04B 7/0417　(2017.01)
　　　H04W 24/10　　(2009.01)

(52) U.S. Cl.
　　　CPC ............ *H04B 7/0697* (2013.01); *H04W 8/24* (2013.01); *H04W 16/28* (2013.01); *H04B 7/0417* (2013.01); *H04B 7/063* (2013.01); *H04W 24/10* (2013.01)

(56) References Cited

U.S. PATENT DOCUMENTS

| | | | |
|---|---|---|---|
| 2014/0045497 A1 | 2/2014 | Abe et al. | |
| 2014/0146697 A1* | 5/2014 | Kim | H04B 7/0417 370/252 |
| 2014/0369308 A1* | 12/2014 | Gerstenberger | H04B 7/0413 370/329 |
| 2016/0007212 A1 | 1/2016 | Kim et al. | |

OTHER PUBLICATIONS

Written Opinion of the International Searching Authority issued in corresponding application No. PCT/JP2016/068728 dated Sep. 6, 2016 (4 pages).
3GPP TS 36.306 V12.4.0, "3rd Generation Partnership Project; Technical Specification Group Radio Access Network; Evolved Universal Terrestrial Radio Access (E-UTRA); User Equipment (UE) radio access capabilities (Release 12)"; Mar. 2015 (41 pages).
3GPP TS 36.331 V12.5.0, "3rd Generation Partnership Project; Technical Specification Group Radio Access Network; Evolved Universal Terrestrial Radio Access (E-UTRA); Radio Resource Control (RRC); Protocol specification (Release 12)"; Mar. 2015 (445 pages).
3GPP TS 36.213 V12.5.0, "3rd Generation Partnership Project; Technical Specification Group Radio Access Network; Evolved Universal Terrestrial Radio Access (E-UTRA); Physical layer procedures (Release 12)"; Mar. 2015 (239 pages).
3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)"; Mar. 2015 (94 pages).
3GPP TS 36.331 V10.16.0, "3rd Generation Partnership Project; Technical Specification Group Radio Access Network; Evolved Universal Terrestrial Radio Access (E-UTRA); Radio Resource Control (RRC); Protocol specification (Release 10)"; Mar. 2015 (312 pages).
3GPP TS 36.212 V10.8.0, "3rd Generation Partnership Project; Technical Specification Group Radio Access Network; Evolved Universal Terrestrial Radio Access (E-UTRA); Multiplexing and channel coding (Release 10)"; Jun. 2013 (79 pages).
3GPP TS 36.306 V10.12.0, "3rd Generation Partnership Project; Technical Specification Group Radio Access Network; Evolved Universal Terrestrial Radio Access (E-UTRA); User Equipment (UE) radio access capabilities (Release 10)"; Mar. 2015 (25 pages).
Nokia Networks, "Discussion on release for supporting rank¾ in TM¾ for additional UE categories"; 3GPP TSG RAN Meeting #68, RP-150666; Mälmo, Sweden; Jun. 15-18, 2015 (4 pages).
Ericsson, "Proposal on capability of UE category to support TM¾ with 4 layers"; 3GPP TSG-RAN WG4 Meeting #75, R4-152895; Fukuoka, Japan; May 25-29, 2015 (10 pages).
Samsung, "Support for up to 4 layers for TM3 and TM4"; 3GPP TSG RAN WG1 Meeting #82, R1-154089; Beijing, China; Aug. 24-28, 2015 (3 pages).
Japanese Office Action entitled Notification of Reasons for Refusal issued in corresponding application No. 2015-129326 dated Aug. 26, 2016 (5 pages).
Extended European Search Report issued in the counterpart European Patent Application No. 16814462.4, dated May 8, 2018 (14 pages).
Office Action in counterpart Chinese Patent Application No. 201680030670.5 dated Apr. 3, 2020 (14 pages).

* cited by examiner

FIG.1
PRIOR ART

```
UE-EUTRA-Capability information element

UE-EUTRA-Capability ::=SEQUENCE {
    accessStratumRelease                    AccessStratumRelease,
    ue-Category    INTEGER (1..5)
    },
    nonCriticalExtension    UE-EUTRA-Capability-v920-IEs    OPTIONAL
    ....
    nonCriticalExtension    UE-EUTRA-Capability-v1020-IEs   OPTIONAL
}
UE-EUTRA-Capability-v1020-IEs ::=    SEQUENCE {
    ue-Category-v1020                   INTEGER (6..8)
    nonCriticalExtension    UE-EUTRA-Capability-v1060-IEs   OPTIONAL
                                                                    OPTIONAL
}
UE-EUTRA-Capability-v1060-IEs ::=    SEQUENCE {
    ...
    nonCriticalExtension    SEQUENCE {}                     OPTIONAL
}
```

FIG. 2

| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |

NOTE: In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.

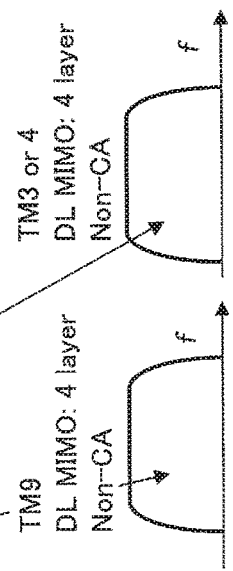

TM9
DL MIMO: 4 layer
Non-CA

TM3 or 4
DL MIMO: 4 layer
Non-CA

FIG.6

5.1.4.1.2 Bit collection, selection and transmission where $N_{IR}$ is equal to:

$$N_{IR} = \left\lfloor \frac{N_{soft}}{K_C \cdot K_{MIMO} \cdot \min(M_{DL\_HARQ}, M_{limit})} \right\rfloor$$

where:

If the UE signals *ue-Category-v12xx* indicating UE category 0, or if the UE signals *ue-Category-v12xx* not indicating UE category 0 and is configured by higher layers with *altCQI-Table-r12* for the DL cell, $N_{soft}$ is the total number of soft channel bits according to the UE category indicated by *ue-Category-v12xx*. Otherwise, if the UE signals *ue-Category-v11xx*, and is configured by higher layers with *altCQI-Table-r12* for the DL cell, $N_{soft}$ is the total number of soft channel bits according to the UE category indicated by *ue-Category-v11xx*. Otherwise, if the UE signals *ue-Category-v1020*, and is configured with transmission mode 9, transmission mode 10, transmission mode 3 up to rank 4 or transmission mode 4 up to rank 4 for the DL cell, $N_{soft}$ is the total number of soft channel bits [4] according to the UE category indicated by *ue-Category-v1020* [6]. Otherwise, $N_{soft}$ is the total number of soft channel bits [4] according to the UE category indicated by *ue-Category* (without suffix) [6].

FIG.7A

```
                    AntennaInfo information elements

-- ASN1START

AntennaInfoCommon ::=       SEQUENCE {
    antennaPortsCount           ENUMERATED {an1, an2, an4, spare1}
}

AntennaInfoDedicated-r10 ::=    SEQUENCE {
    transmissionMode-r10            ENUMERATED {
                        tm1, tm2, tm3, tm4, tm5, tm6, tm7, tm8-v920,
                        tm9-v1020, tm10-v1130, tm3-rank4-v12xy,
tm4-rank4-v12xy, spare4,
                                    spare3, spare2, spare1},
    codebookSubsetRestriction-r10   BIT STRING          OPTIONAL,         -- Cond TMX
    ue-TransmitAntennaSelection CHOICE{
        release                     NULL,
        setup                       ENUMERATED {closedLoop, openLoop}
    }
}

AntennaInfoDedicated-v1250 ::=  SEQUENCE {
    alternativeCodebookEnabledFor4TX-r12      BOOLEAN
}

-- ASN1STOP
```

FIG.7B

| AntennaInfo field descriptions |
|---|
| transmissionMode<br>Points to one of Transmission modes defined in TS 36.213 [23, 7.1] where tm1 refers to transmission mode 1, tm2 to transmission mode 2 etc. <u>Value tm3-rank4 denotes up to rank 4 operation for transmission mode 3. Value tm4-rank4 denotes up to rank 4 operation for transmission mode 4</u> |

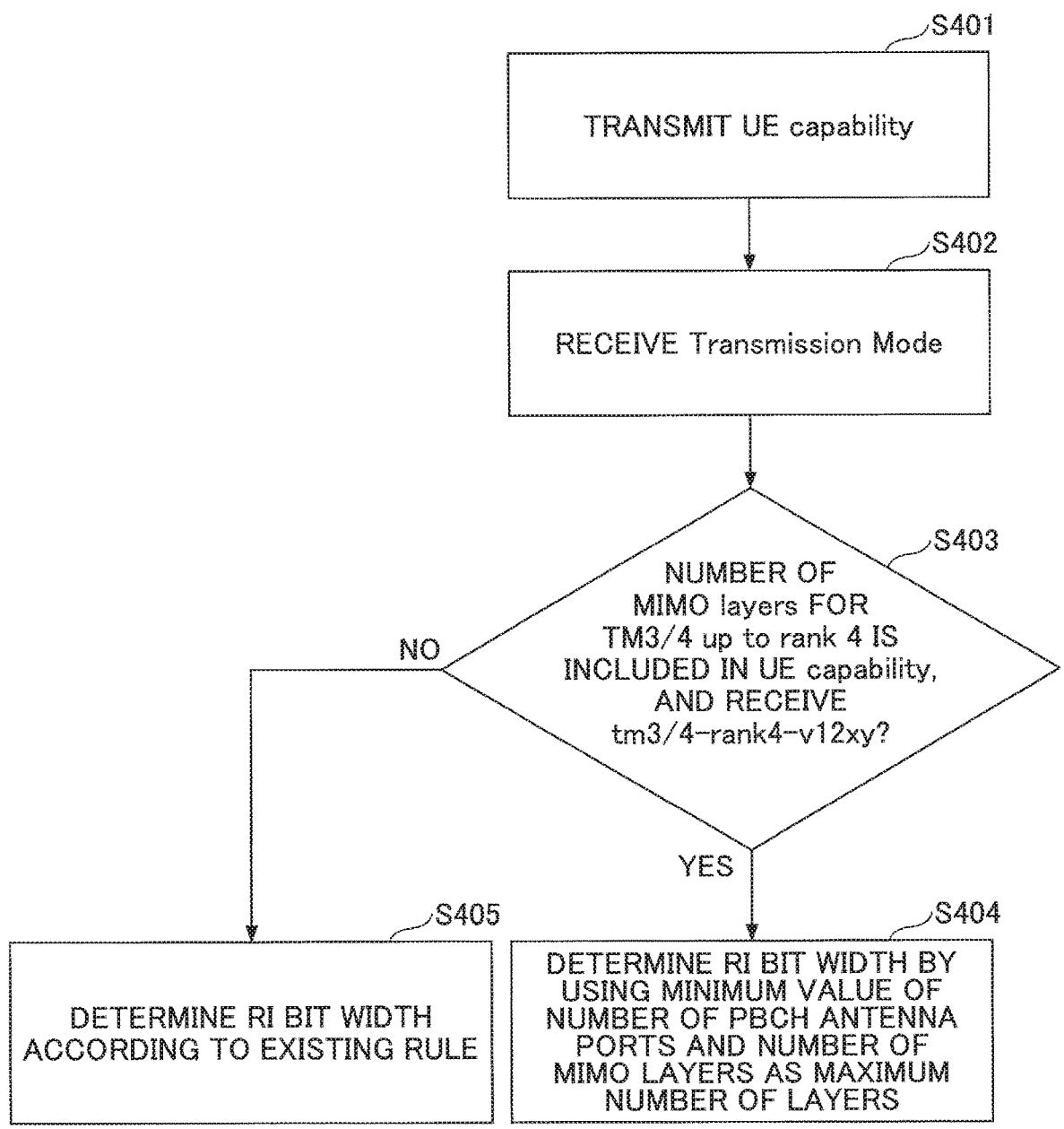

FIG.9

| Field | Bit width | | | | | | |
|---|---|---|---|---|---|---|---|
| | 2 antenna ports | 4 antenna ports | | 8 antenna ports | | | |
| | | Max 2 layers | Max 4 layers | Max 2 layers | Max 4 layers | Max 8 layers | |
| Rank indication | 1 | 1 | 2 | 1 | 2 | 3 | |

FIG.10

For rank indication (RI) (RI only, joint report of RI and i1, and joint report of RI and PTI)

- The corresponding bit widths for RI feedback for PDSCH transmissions are given by Tables 5.2.2.6.1-2, 5.2.2.6.2-3, 5.2.2.6.3-3, 5.2.3.3.1-3, 5.2.3.3.1-3A, 5.2.3.3.2-4, and 5.2.3.3.2-4A, which are determined assuming the maximum number of layers as follows:

o If the UE is configured with transmission mode 9, and the *supportedMIMO-CapabilityDL-r10* field is included in the *UE-EUTRA-Capability*, the maximum number of layers is determined according to the minimum of the configured number of CSI-RS ports and the maximum of the reported UE downlink MIMO capabilities for the same band in the corresponding band combination.

o If the UE is configured with transmission mode 9, and the *supportedMIMO-CapabilityDL-r10* field is not included in the *UE-EUTRA-Capability*, the maximum number of layers is determined according to the minimum of the configured number of CSI-RS ports and *ue-Category* (without suffix).

o If the UE is configured with transmission mode 10, and the *supportedMIMO-CapabilityDL-r10* field is included in the *UE-EUTRA-Capability*, the maximum number of layers for each CSI process is determined according to the minimum of the configured number of CSI-RS ports for that CSI process and the maximum of the reported UE downlink MIMO capabilities for the same band in the corresponding band combination.

o <u>If the UE is configured with transmission mode 10, and the *supportedMIMO-CapabilityDL-r10* field is not included in the *UE-EUTRA-Capability*, the maximum number of layers for each CSI process is determined according to the minimum of the configured number of CSI-RS ports for that CSI process and *ue-Category* (without suffix).</u> o <u>If the UE is configured with transmission mode 3 or 4 up to Rank4 operation, and the *supportedMIMO-TM3(or 4)-CapabilityDL-r12* field is included in the *UE-EUTRA-Capability*, the maximum number is determined according to the minimum of the number of PBCH antenna ports and the reported UE downlink MIMO capabilities in the *supportedMIMO-TM3(or 4)-CapabilityDL-r12* field for the same band in the corresponding band combination.</u> o Otherwise the maximum number of layers is determined according to the minimum of the number of PBCH antenna ports and *ue-Category* (without suffix).

FIG.11A

```
                 UE-EUTRA-Capability information element

-- ASN1START
<< skip unchanged part >>
UE-EUTRA-Capability-v1250-IEs ::=    SEQUENCE {
<< skip unchanged part >>
    nonCriticalExtension             UE-EUTRA-Capability-v12xy-IEs
        OPTIONAL
}

UE-EUTRA-Capability-v12xy-IEs ::=    SEQUENCE {
    rf-Parameters-v12xy              RF-Parameters-v12xy                   OPTIONAL,
    nonCriticalExtension             SEQUENCE {}                           OPTIONAL
}
<< skip unchanged part >>
RF-Parameters-v12xy ::=              SEQUENCE {
    supportedBandCombination-v12xy   SupportedBandCombination-v12xy        OPTIONAL,
    supportedBandCombinationAdd-v12xy SupportedBandCombinationAdd-v12xy    OPTIONAL
}
<< skip unchanged part >>
SupportedBandCombination-v12xy ::= SEQUENCE (SIZE (1..maxBandComb-r10)) OF
 BandCombinationParameters-v12xy
<< skip unchanged part >>
SupportedBandCombinationAdd-v12xy ::= SEQUENCE (SIZE (1..maxBandComb-r11)) OF
 BandCombinationParameters-v12xy
<< skip unchanged part >>
BandCombinationParameters-r11 ::=    SEQUENCE {
    bandParameterList-v12xy          SEQUENCE (SIZE (1..maxSimultaneousBands-r10)) OF
        BandParameters-v12xy         OPTIONAL
}
<< skip unchanged part >>
BandParameters-v12xy ::= SEQUENCE {
    bandParametersDL-v12xy           SEQUENCE (SIZE (1..maxBandwidthClass-r10)) OF
 CA-MIMO-ParametersDL-v12xy
}
<< skip unchanged part >>
CA-MIMO-ParametersDL-v12xy ::= SEQUENCE {
    supportedMIMO-TM3-CapabilityDL-r12   ENUMERATED {twoLayers, fourLayers},   OPTIONAL
    supportedMIMO-TM4-CapabilityDL-r12   ENUMERATED {twoLayers, fourLayers}    OPTIONAL
}
<< skip unchanged part >>
-- ASN1STOP
```

FIG.11B

| UE-EUTRA-Capability field descriptions | FDD/TDD diff |
|---|---|
| suppotedMIMO-TM3-CapabilityDL<br>Indicates the maximum number of spatial multiplexing layers for transmission mode 3 in DL. | |
| suppotedMIMO-TM4-CapabilityDL<br>Indicates the maximum number of spatial multiplexing layers for transmission mode 4 in DL. | |

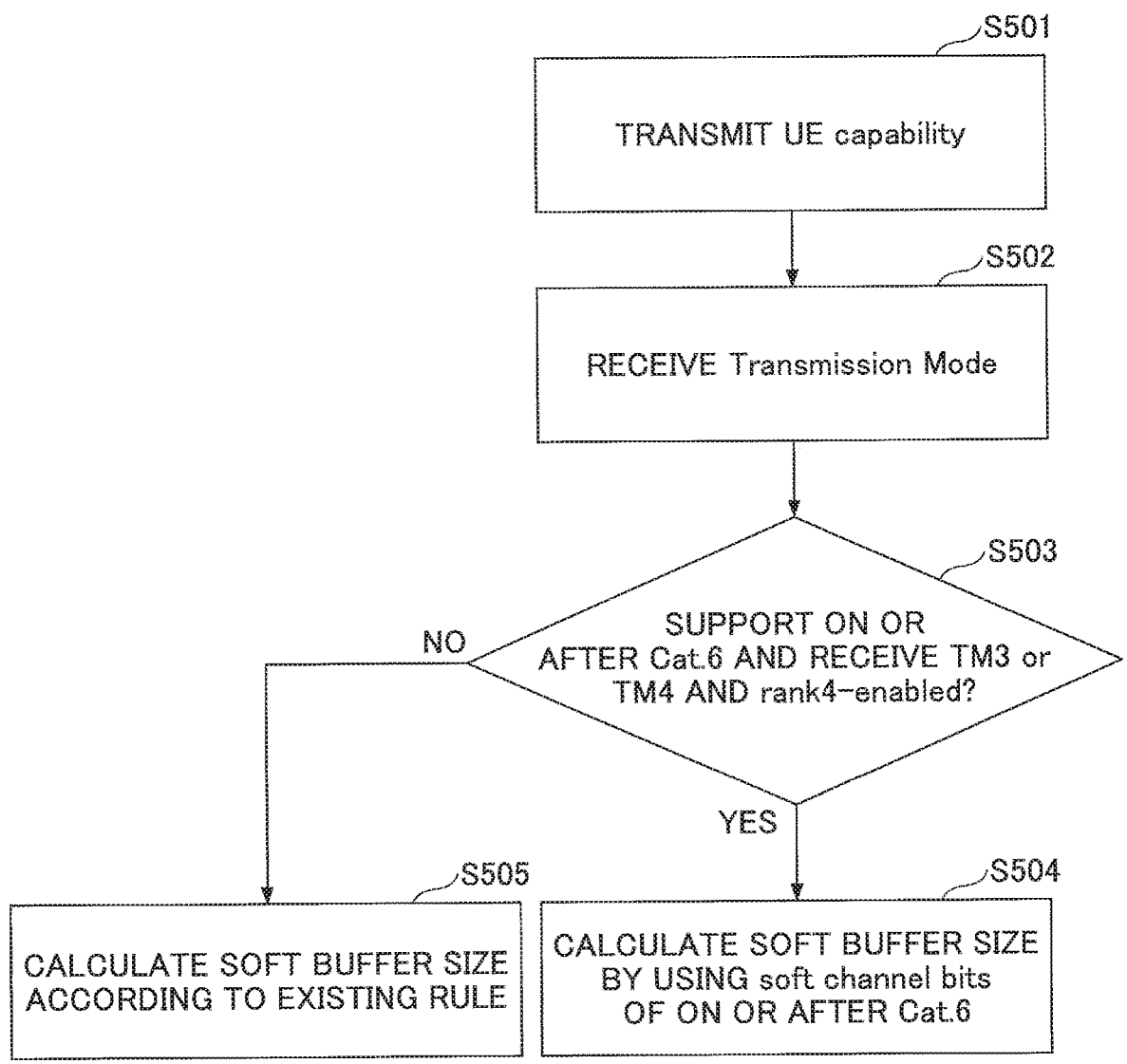

FIG.13

5.1.4.1.2 Bit collection, selection and transmission where $N_{IR}$ is equal to:

$$N_{IR} = \left\lfloor \frac{N_{soft}}{K_C \cdot K_{MIMO} \cdot \min(M_{DL\_HARQ}, M_{limit})} \right\rfloor$$

where:

If the UE signals *ue-Category-v12xx* indicating UE category 0, or if the UE signals *ue-Category-v12xx* not indicating UE category 0 and is configured by higher layers with *altCQI-Table-r12* for the DL cell, $N_{soft}$ is the total number of soft channel bits according to the UE category indicated by *ue-Category-v12xx*. Otherwise, if the UE signals *ue-Category-v11xx*, and is configured by higher layers with *altCQI-Table-r12* for the DL cell, $N_{soft}$ is the total number of soft channel bits according to the UE category indicated by *ue-Category-v11xx*. Otherwise, if the UE signals *ue-Category-v1020*, and is configured with transmission mode 9 or transmission mode 10 for the DL cell, $N_{soft}$ is the total number of soft channel bits [4] according to the UE category indicated by *ue-Category-v1020* [6]. <u>Otherwise, if the UE signals *ue-Category-v1020*, and is configured with transmission mode 3 or transmission mode 4, and is configured by higher layers with *rank4-enabled-r12* for the DL cell, $N_{soft}$ is the total number of soft channel bits [4] according to the UE category indicated by *ue-Category-v1020* [6].</u> Otherwise, $N_{soft}$ is the total number of soft channel bits [4] according to the UE category indicated by *ue-Category* (without suffix) [6].

FIG.14A

*AntennaInfo information elements*

```
-- ASN1START

AntennaInfoDedicated-v1250 ::=      SEQUENCE {
    alternativeCodebookEnabledFor4TX-r12    BOOLEAN
}

AntennaInfoDedicated-v12xy ::=      SEQUENCE {
    rank4-enabled-r12                       BOOLEAN      OPTIONAL    -- Cond TM34
}

-- ASN1STOP
```

FIG.14B

| Antennalnfo field descriptions |
|---|
| *Rank4-enabled* <br> Indicates that up to rank4 operation is enabled for transmission mode 3 or 4. |

FIG.14C

| Conditional presence | Explanation |
|---|---|
| TM34 | The field is optional present, need ON, if the transmissionMode (without suffix) or transmissionMode-r10 is set to tm3 or tm4. Otherwise, the field is not present and the UE shall delete any existing value for this field. |

FIG.15A

```
PhysicalConfigDedicated information element

-- ASN1START

[[  antennaInfo-v1250              AntennaInfoDedicated-v1250    OPTIONAL,
-- Cond AI-r10
        eimta-MainConfig-r12           EIMTA-MainConfig-r12          OPTIONAL,    -- Need ON
        eimta-MainConfigPCell-r12      EIMTA-MainConfigServCell-r12  OPTIONAL,
-- Need ON
        pucch-ConfigDedicated-v1250    PUCCH-ConfigDedicated-v1250   OPTIONAL,    -- Need ON
        cqi-ReportConfigPCell-v1250    CQI-ReportConfig-v1250        OPTIONAL,    -- Need ON
        uplinkPowerControlDedicated-v1250  UplinkPowerControlDedicated-v1250  OPTIONAL,
-- Need ON
        pusch-ConfigDedicated-v1250    PUSCH-ConfigDedicated-v1250   OPTIONAL,    -- Need ON
        csi-RS-Config-v1250            CSI-RS-Config-v1250           OPTIONAL     -- Need ON
    ]],
    [[  antennaInfo-v12xy              AntennaInfoDedicated-v12xy    OPTIONAL
-- Cond AI-rX
    ]]
}

[[  antennaInfo-v1250              AntennaInfoDedicated-v1250    OPTIONAL,    -- Need ON
        eimta-MainConfigSCell-r12      EIMTA-MainConfigServCell-r12  OPTIONAL,    -- Need ON
        cqi-ReportConfigSCell-v1250    CQI-ReportConfig-v1250        OPTIONAL,    -- Need ON
        uplinkPowerControlDedicatedSCell-v1250  UplinkPowerControlDedicated-v1250  OPTIONAL,
-- Need ON
        csi-RS-Config-v1250            CSI-RS-Config-v1250           OPTIONAL     -- Need ON
    ]],
    [[  antennaInfo-v12xy              AntennaInfoDedicated-v12xy    OPTIONAL
-- Cond AI-rX
    ]]
}

CSI-RS-ConfigNZPToAddModList-r11 ::=    SEQUENCE (SIZE (1..maxCSI-RS-NZP-r11)) OF
CSI-RS-ConfigNZP-r11

CSI-RS-ConfigNZPToReleaseList-r11 ::=   SEQUENCE (SIZE (1..maxCSI-RS-NZP-r11)) OF
CSI-RS-ConfigNZPId-r11

CSI-RS-ConfigZPToAddModList-r11 ::= SEQUENCE (SIZE (1..maxCSI-RS-ZP-r11)) OF
CSI-RS-ConfigZP-r11

CSI-RS-ConfigZPToReleaseList-r11 ::=    SEQUENCE (SIZE (1..maxCSI-RS-ZP-r11)) OF
CSI-RS-ConfigZPId-r11

-- ASN1STOP
```

FIG.15B

| Conditional presence | Explanation |
|---|---|
| AI-rX | The field is optionally present, need ON, if *antennaInfoDedicated* (without suffix) or *antennaInfoDedicated-r10* is present. Otherwise the field is not present. |

FIG.17

> For rank indication (RI) (RI only, joint report of RI and i1, and joint report of RI and PTI)
>
> – The corresponding bit widths for RI feedback for PDSCH transmissions are given by Tables 5.2.2.6.1-2, 5.2.2.6.2-3, 5.2.2.6.3-3, 5.2.3.3.1-3, 5.2.3.3.1-3A, 5.2.3.3.2-4, and 5.2.3.3.2-4A, which are determined assuming the maximum number of layers as follows:
>
> ○ If the UE is configured with transmission mode 9, and the *supportedMIMO-CapabilityDL-r10* field is included in the *UE-EUTRA-Capability*, the maximum number of layers is determined according to the minimum of the configured number of CSI-RS ports and the maximum of the reported UE downlink MIMO capabilities for the same band in the corresponding band combination.
> ○ If the UE is configured with transmission mode 9, and the *supportedMIMO-CapabilityDL-r10* field is not included in the *UE-EUTRA-Capability*, the maximum number of layers is determined according to the minimum of the configured number of CSI-RS ports and *ue-Category* (without suffix).
> ○ If the UE is configured with transmission mode 10, and the *supportedMIMO-CapabilityDL-r10* field is included in the *UE-EUTRA-Capability*, the maximum number of layers for each CSI process is determined according to the minimum of the configured number of CSI-RS ports for that CSI process and the maximum of the reported UE downlink MIMO capabilities for the same band in the corresponding band combination.
> ○ If the UE is configured with transmission mode 10, and the *supportedMIMO-CapabilityDL-r10* field is not included in the *UE-EUTRA-Capability*, the maximum number of layers for each CSI process is determined according to the minimum of the configured number of CSI-RS ports for that CSI process and *ue-Category* (without suffix).
> ○ If the UE is configured with transmission mode 3 or 4, and is configured by higher layers with *rank4-enabled-r12* for the DL cell, and the *supportedMIMO-TM3(or 4)-CapabilityDL-r12* field is included in the *UE-EUTRA-Capability*, the maximum number is determined according to the minimum of the number of PBCH antenna ports and the reported UE downlink MIMO capabilities in the *supportedMIMO-TM3(or 4)-CapabilityDL-r12* field for the same band in the corresponding band combination.
> ○ Otherwise the maximum number of layers is determined according to the minimum of the number of PBCH antenna ports and *ue-Category* (without suffix).

FIG.19

5.1.4.1.2 Bit collection, selection and transmission where $N_{IR}$ is equal to:

$$N_{IR} = \left\lfloor \frac{N_{soft}}{K_C \cdot K_{MIMO} \cdot \min(M_{DL\_HARQ}, M_{limit})} \right\rfloor$$

where:

If the UE signals *ue-Category-v12xx* indicating UE category 0, or if the UE signals *ue-Category-v12xx* not indicating UE category 0 and is configured by higher layers with *altCQI-Table-r12* for the DL cell, $N_{soft}$ is the total number of soft channel bits according to the UE category indicated by *ue-Category-v12xx*. Otherwise, if the UE signals *ue-Category-v11xx*, and is configured by higher layers with *altCQI-Table-r12* for the DL cell, $N_{soft}$ is the total number of soft channel bits according to the UE category indicated by *ue-Category-v11xx*. Otherwise, if the UE signals *ue-Category-v1020*, and is configured with transmission mode 9 or transmission mode 10 for the DL cell, $N_{soft}$ is the total number of soft channel bits [4] according to the UE category indicated by *ue-Category-v1020* [6]. Otherwise, if the UE signals *ue-Category-v1020*, and is configured with transmission mode 3 or transmission mode 4, and is configured by higher layers with *maxLayers-RI-report-r12* for the DL cell, $N_{soft}$ is the total number of soft channel bits [4] according to the UE category indicated by *ue-Category-v1020* [6]. Otherwise, $N_{soft}$ is the total number of soft channel bits [4] according to the UE category indicated by *ue-Category* (without suffix) [6].

FIG.20A

*CQI-ReportConfig* information elements

```
-- ASN1START
<< skip unchanged part >>
CQI-ReportConfig-v12xy ::=    SEQUENCE {
    cqi-ReportBoth-v12xy              CQI-ReportBoth-v12xy
}
<< skip unchanged part >>
CQI-ReportBoth-v12xy ::=      SEQUENCE {
    maxLayers-RI-report-r12           ENUMERATED {twoLayers, fourLayers, eightLayers}
}
<< skip unchanged part >>
-- ASN1STOP
```

FIG.20B

| CQI-ReportConfig field descriptions |
|---|
| *maxLayers-RI-report* <br> Indicates the maximum number of layers used to determine the rank indication bit width according to TS 36.212 [22]. |

FIG.20C

```
                PhysicalConfigDedicated information element

-- ASN1START

PhysicalConfigDedicated ::=        SEQUENCE {
<< skip unchanged part >>
    [[  antennaInfo-v1250            AntennaInfoDedicated-v1250    OPTIONAL,    -- Cond AI-r10
        eimta-MainConfig-r12         EIMTA-MainConfig-r12          OPTIONAL,    -- Need ON
        eimta-MainConfigPCell-r12    EIMTA-MainConfigServCell-r12  OPTIONAL,    -- Need ON
        pucch-ConfigDedicated-v1250  PUCCH-ConfigDedicated-v1250   OPTIONAL,    -- Need ON
        cqi-ReportConfigPCell-v1250  CQI-ReportConfig-v1250        OPTIONAL,    -- Need ON
        uplinkPowerControlDedicated-v1250   UplinkPowerControlDedicated-v1250  OPTIONAL,
-- Need ON
        pusch-ConfigDedicated-v1250  PUSCH-ConfigDedicated-v1250   OPTIONAL,    -- Need ON
        csi-RS-Config-v1250          CSI-RS-Config-v1250           OPTIONAL     -- Need ON
    ]],
    [[  cqi-ReportConfigPCell-v12xy  CQI-ReportConfig-v12xy        OPTIONAL,    -- Need ON
    ]]
}
PhysicalConfigDedicatedSCell-r10 ::=  SEQUENCE {
<< skip unchanged part >>
    [[  antennaInfo-v1250            AntennaInfoDedicated-v1250    OPTIONAL,    -- Need ON
        eimta-MainConfigSCell-r12    EIMTA-MainConfigServCell-r12  OPTIONAL,    -- Need ON
        cqi-ReportConfigSCell-v1250  CQI-ReportConfig-v1250        OPTIONAL,    -- Need ON
        uplinkPowerControlDedicatedSCell-v1250  UplinkPowerControlDedicated-v1250  OPTIONAL,
-- Need ON
        csi-RS-Config-v1250          CSI-RS-Config-v1250           OPTIONAL     -- Need ON
    ]],
    [[  cqi-ReportConfigSCell-v12xy  CQI-ReportConfig-v12xy        OPTIONAL,    -- Need ON
    ]]
}
<< skip unchanged part >>
-- ASN1STOP
```

FIG.22

For rank indication (RI) (RI only, joint report of RI and i1, and joint report of RI and PTI)

- The corresponding bit widths for RI feedback for PDSCH transmissions are given by Tables 5.2.2.6.1-2, 5.2.2.6.2-3, 5.2.2.6.3-3, 5.2.3.3.1-3, 5.2.3.3.1-3A, 5.2.3.3.2-4, and 5.2.3.3.2-4A, which are determined assuming the maximum number of layers as follows:

o  If the UE is configured with transmission mode 9, and the *supportedMIMO-CapabilityDL-r10* field is included in the *UE-EUTRA-Capability*, the maximum number of layers is determined according to the minimum of the configured number of CSI-RS ports and the maximum of the reported UE downlink MIMO capabilities for the same band in the corresponding band combination.
    o  If the UE is configured with transmission mode 9, and the *supportedMIMO-CapabilityDL-r10* field is not included in the *UE-EUTRA-Capability*, the maximum number of layers is determined according to the minimum of the configured number of CSI-RS ports and *ue-Category* (without suffix).
    o  If the UE is configured with transmission mode 10, and the *supportedMIMO-CapabilityDL-r10* field is included in the *UE-EUTRA-Capability*, the maximum number of layers for each CSI process is determined according to the minimum of the configured number of CSI-RS ports for that CSI process and the maximum of the reported UE downlink MIMO capabilities for the same band in the corresponding band combination.
    o  If the UE is configured with transmission mode 10, and the *supportedMIMO-CapabilityDL-r10* field is not included in the *UE-EUTRA-Capability*, the maximum number of layers for each CSI process is determined according to the minimum of the configured number of CSI-RS ports for that CSI process and *ue-Category* (without suffix).
    o  If the UE is configured with transmission mode 3 or 4, and is configured by higher layers with *maxLayers-RI-report-r12* for the DL cell, and the *supportedMIMO-TM3(or 4)-CapabilityDL-r12* field is included in the *UE-EUTRA-Capability*, the maximum number is determined according to the minimum of the number of PBCH antenna ports and the configured *maxLayers-RI-report-r12* field for the same band in the corresponding band combination.
    o  Otherwise the maximum number of layers is determined according to the minimum of the number of PBCH antenna ports and *ue-Category* (without suffix).

FIG.24

5.1.4.1.2 Bit collection, selection and transmission where $N_{IR}$ is equal to:

$$N_{IR} = \left\lfloor \frac{N_{soft}}{K_C \cdot K_{MIMO} \cdot \min(M_{DL\_HARQ}, M_{limit})} \right\rfloor$$

where:

If the UE signals *ue-Category-v12xx* indicating UE category 0, or if the UE signals *ue-Category-v12xx* not indicating UE category 0 and is configured by higher layers with *altCQI-Table-r12* for the DL cell, $N_{soft}$ is the total number of soft channel bits according to the UE category indicated by *ue-Category-v12xx*. Otherwise, if the UE signals *ue-Category-v11xx*, and is configured by higher layers with *altCQI-Table-r12* for the DL cell, $N_{soft}$ is the total number of soft channel bits according to the UE category indicated by *ue-Category-v11xx*. Otherwise, if the UE signals *ue-Category-v1020*, and is configured with transmission mode 9 or transmission mode 10 for the DL cell, $N_{soft}$ is the total number of soft channel bits [4] according to the UE category indicated by *ue-Category-v1020* [6]. <u>Otherwise, if the UE signals *ue-Category-v1020*, and is configured with transmission mode 3 or transmission mode 4, and is configured by higher layers with *ue-RI-Bit-Width-r12* for the DL cell, $N_{soft}$ is the total number of soft channel bits [4] according to the UE category indicated by *ue-Category-v1020* [6].</u> Otherwise, $N_{soft}$ is the total number of soft channel bits [4] according to the UE category indicated by *ue-Category* (without suffix) [6].

FIG.25A

*CQI-ReportConfig* information elements

```
-- ASN1START
<< skip unchanged part >>
CQI-ReportConfig-v12xy ::=    SEQUENCE {
    cqi-ReportBoth-v12xy           CQI-ReportBoth-v12xy
}
<< skip unchanged part >>
CQI-ReportBoth-v12xy ::=           SEQUENCE {
    Ue-RI-Bit-Width-r12        ENUMERATED {b1, b2, b3}
}
<< skip unchanged part >>
-- ASN1STOP
```

FIG.25B

| CQI-ReportConfig field descriptions |
|---|
| *ue-RI-Bit-Width* <br> Indicates the rank indication bit width as specified in TS 36.212 [22]. Value b1 denotes 1 bit, value b2 denotes 2 bits and so on. |

FIG.25C

```
                    PhysicalConfigDedicated information element

-- ASN1START

PhysicalConfigDedicated ::=     SEQUENCE {
<< skip unchanged part >>
     [[ antennaInfo-v1250              AntennaInfoDedicated-v1250   OPTIONAL,    -- Cond AI-r10
        eimta-MainConfig-r12           EIMTA-MainConfig-r12         OPTIONAL,    -- Need ON
        eimta-MainConfigPCell-r12      EIMTA-MainConfigServCell-r12 OPTIONAL,    -- Need ON
        pucch-ConfigDedicated-v1250    PUCCH-ConfigDedicated-v1250  OPTIONAL,    -- Need ON
        cqi-ReportConfigPCell-v1250    CQI-ReportConfig-v1250       OPTIONAL,    -- Need ON
        uplinkPowerControlDedicated-v1250  UplinkPowerControlDedicated-v1250  OPTIONAL,
-- Need ON
        pusch-ConfigDedicated-v1250    PUSCH-ConfigDedicated-v1250  OPTIONAL,    -- Need ON
        csi-RS-Config-v1250            CSI-RS-Config-v1250          OPTIONAL     -- Need ON
     ]],
     [[ cqi-ReportConfigPCell-v12xy    CQI-ReportConfig-v12xy       OPTIONAL,    -- Need ON
     ]]
}
PhysicalConfigDedicatedSCell-r10 ::=   SEQUENCE {
<< skip unchanged part >>
     [[ antennaInfo-v1250              AntennaInfoDedicated-v1250   OPTIONAL,    -- Need ON
        eimta-MainConfigSCell-r12      EIMTA-MainConfigServCell-r12 OPTIONAL,    -- Need ON
        cqi-ReportConfigSCell-v1250    CQI-ReportConfig-v1250       OPTIONAL,    -- Need ON
        uplinkPowerControlDedicatedSCell-v1250  UplinkPowerControlDedicated-v1250  OPTIONAL,
-- Need ON
        csi-RS-Config-v1250            CSI-RS-Config-v1250          OPTIONAL     -- Need ON
     ]],
     [[ cqi-ReportConfigSCell-v12xy    CQI-ReportConfig-v12xy       OPTIONAL,    -- Need ON
     ]]
}
<< skip unchanged part >>
-- ASN1STOP
```

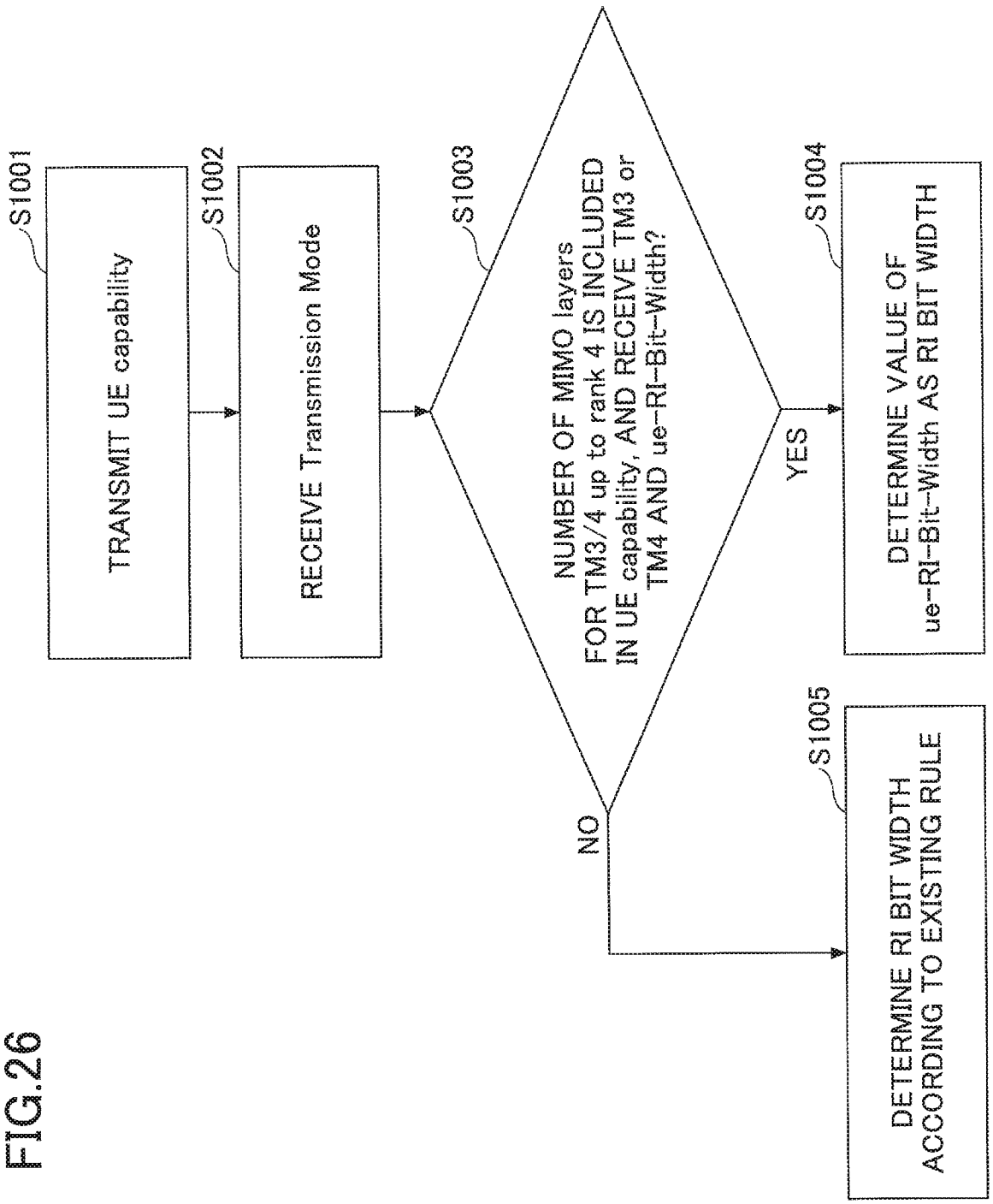

FIG.27

For rank indication (RI) (RI only, joint report of RI and i1, and joint report of RI and PTI)

- The corresponding bit widths for RI feedback for PDSCH transmissions are given by Tables 5.2.2.6.1-2, 5.2.2.6.2-3, 5.2.2.6.3-3, 5.2.3.3.1-3, 5.2.3.3.1-3A, 5.2.3.3.2-4, and 5.2.3.3.2-4A, which are determined assuming the maximum number of layers as follows:

o  If the UE is configured with transmission mode 9, and the *supportedMIMO-CapabilityDL-r10* field is included in the *UE-EUTRA-Capability*, the maximum number of layers is determined according to the minimum of the configured number of CSI-RS ports and the maximum of the reported UE downlink MIMO capabilities for the same band in the corresponding band combination.
    o  If the UE is configured with transmission mode 9, and the *supportedMIMO-CapabilityDL-r10* field is not included in the *UE-EUTRA-Capability*, the maximum number of layers is determined according to the minimum of the configured number of CSI-RS ports and *ue-Category* (without suffix).
    o  If the UE is configured with transmission mode 10, and the *supportedMIMO-CapabilityDL-r10* field is included in the *UE-EUTRA-Capability*, the maximum number of layers for each CSI process is determined according to the minimum of the configured number of CSI-RS ports for that CSI process and the maximum of the reported UE downlink MIMO capabilities for the same band in the corresponding band combination.
    o  If the UE is configured with transmission mode 10, and the *supportedMIMO-CapabilityDL-r10* field is not included in the *UE-EUTRA-Capability*, the maximum number of layers for each CSI process is determined according to the minimum of the configured number of CSI-RS ports for that CSI process and *ue-Category* (without suffix).
    o  If the UE is configured with transmission mode 3 or 4, and is configured by higher layers with *ue-RI-Bit-Width-r12* for the DL cell, and the *supportedMIMO-TM3(or 4)-CapabilityDL-r12* field is included in the *UE-EUTRA-Capability*, the RI bit width is determined according to the *ue-RI-Bit-Width-r12* value for the DL cell signalled to the UE.
    o  Otherwise the maximum number of layers is determined according to the minimum of the number of PBCH antenna ports and *ue-Category* (without suffix).

USER APPARATUS AND UPLINK CONTROL INFORMATION BIT WIDTH DETERMINATION METHOD

CROSS-REFERENCE TO RELATED APPLICATIONS

The present application is a Continuation Application and, thereby, claims benefit under 35 U.S.C. § 120 to U.S. application Ser. No. 15/567,715, filed on Oct. 19, 2017, titled, "USER APPARATUS AND UPLINK CONTROL INFORMATION BIT WIDTH DETERMINATION METHOD," which is a U.S. National Stage Application of PCT Application No. PCT/JP2016/068728, filed on Jun. 23, 2016, which claims priority to Japanese Patent Application No. 2015-129326, filed on Jun. 26, 2015. The contents of the priority applications are incorporated by reference in their entirety.

TECHNICAL FIELD

The present invention relates to a user apparatus and a base station in a mobile communication system that supports spatial multiplexing.

BACKGROUND ART

In an LTE (including LTE-Advanced) system, UE categories on capability of the user apparatus UE are defined, and requirements that should be supported are defined for each UE category. For example, the total number of soft channel bits, and the number of supported Multiple-Input Multiple-Output (MIMO) layers and the like are defined for each UE category (non-patent document 1).

Also, in LTE, it is defined that the user apparatus UE reports a UE category of the user apparatus UE itself to the base station eNB by a predetermined message "UE-EUTRA-Capability" (non-patent document 2).

In release 8 (Rel-8, hereinafter) of 3GPP, a field for reporting UE categories 1-5 is defined in the message of UE-EUTRA-Capability. From release 10 (Rel-10, hereinafter), values of UE category 6 and after 6 are additionally defined, so that a field for reporting that is defined. More specifically, for example, in an information element (IE) of UE-EUTRA-Capability shown in FIG. 1, a field for reporting UE categories 1-5 and a field for reporting UE categories 6-8 are defined as indicated by underlines.

Also, in LTE, various Transmission Modes (transmission modes, described as TM hereinafter) that determines a transmission scheme of data (PDSCH) from the base station eNB to the user apparatus UE are defined, so that the user apparatus UE performs data reception operation according to the TM configured from the base station eNB (non-patent document 3). For example, TM3 indicates open loop spatial multiplexing and TM4 indicates closed loop spatial multiplexing. Feedback of an RI (rank number) from the user apparatus UE to the base station eNB is necessary for both of them.

Also, in the user apparatus UE and the base station eNB of LTE, in an HARQ entity of an MAC (Media Access Control) layer, HARQ (Hybrid ARQ) control is performed. For example, in HARQ control for downlink data in the user apparatus UE, when decoding of downlink data (TB: transport block) succeeds, the user apparatus UE returns ACK to the base station eNB. When decoding fails, the user apparatus UE returns NACK to the base station eNB. Accordingly, in HARQ, retransmission control is performed by transmitting ACK/NACK. In HARQ, when the user apparatus UE fails in decoding of received data (when data is erroneous), the user apparatus UE holds the data, combines data retransmitted from the base station eNB and the held data, and decodes the combined data. Accordingly, strong tolerance against errors is provided. A storage unit for holding the data (memory area) is called a soft buffer.

RELATED ART DOCUMENT

Non Patent Document

[NON PATENT DOCUMENT 1] 3GPP TS 36.306 V12.4.0 (2015-03)
[NON PATENT DOCUMENT 2] 3GPP TS 36.331 V12.5.0 (2015-03)
[NON PATENT DOCUMENT 3] 3GPP TS 36.213 V12.5.0 (2015-03)
[NON PATENT DOCUMENT 4] 3GPP TS 36.212 V12.4.0 (2015-03)

SUMMARY OF THE INVENTION

Problem to be Solved by the Invention

The user apparatus UE of a UE category on or after category 6 introduced in Rel-10 can perform 4 layer (4×4MIMO) reception by being configured with TM3, TM4, TM9, TM10 and the like. However, in the UE category on or after UE category 6, it is assumed that TM9 or TM10 are used instead of TM3 or TM4 (TM3/4 hereinafter). Therefore, in 4 layer reception by TM3/4, there is a limitation in determining a soft buffer size as described below.

That is, in "5.1.4.1.2 Bit collection, selection and transmission" of non-patent document 4 which is a conventional specification, a determination method of $N_{soft}$ (the total number of soft channel bits of UE (=total soft buffer size)) that is used for calculating a soft buffer size ($N_{IR}$) per 1 TB is defined as "if the UE signals ue-Category-v1020, and is configured with transmission mode 9 or transmission mode 10 for the DL cell, $N_{soft}$ is the total number of soft channel bits [4] according to the UE category indicated by ue-Category-v1020 [6]. Otherwise, $N_{soft}$ is the total number of soft channel bits [4] according to the UE category indicated by ue-Category (without suffix) [6].".

As described above, the total number of soft channel bits corresponding to the UE category (ue-Category-v1020) of Rel-10 is referred to when TM9/10 is configured. On the other hand, when TM3/4 is configured, even if the UE category (ue-Category-v1020) of Rel-10 is reported, the "Otherwise" is applied, so that the user apparatus UE refers to the total number of soft channel bits corresponding to the ue-Category of Rel-8. In the conventional specification, the user apparatus UE supporting category 6/7 reports the category 6/7 by a parameter of Rel-10, and reports category 4 by a parameter of Rel-8.

FIG. 2 shows an example of the above-mentioned situation with a table of the UE category described in non-patent document 1.

For example, if the user apparatus UE supporting category 6 is configured with TM9, the user apparatus UE refers to the total number of soft channel bits corresponding to category 6 as $N_{soft}$, but, if the user apparatus UE is configured with TM3/4, the user apparatus UE refers to the total number of soft channel bits corresponding to category 4 as $N_{soft}$ as shown in FIG. 2. As shown in FIG. 2, since the total number of soft channel bits corresponding to category 4 is half of the total number of soft channel bits corresponding to category 6, there is a possibility that quality deteriorates in a communication environment where HARQ retransmission occurs.

Also, as described above, feedback of an RI is necessary in TM3/4. However, in the conventional technique, there is a problem in that there is a case where an RI bit width (bit length) used for reporting of an RI cannot be properly determined if TM3/4 is configured.

That is, in "5.2.2.6 Channel coding of control information" of non-patent document 4, it is described that a bit width used for RI feedback is determined from a table such as 5.2.2.6.1-2, and also, it is described that, the maximum number of layers used when referring to the table (the maximum number of DL MIMO layers that the UE supports) is determined based on a value such as "supportedMIMO-CapabilityDL-r10 field".

However, it is defined to apply, if TM3/4 is configured, "Otherwise the maximum number of layers is determined according to the minimum of the number of PBCH antenna ports and ue-Category (without suffix)". Therefore, when the user apparatus UE is configured with TM3/4, the number of layers (which is "2" from FIG. 2) corresponding to category 4 is used as the maximum number of layers even if the UE supports category 6/7. Therefore, the RI bit width becomes 1 bit at the maximum. When the RI bit width is 1, only 1 or 2 can be reported as an RI (Rank). Therefore, there occurs a problem in that, even if the use apparatus UE has capability for performing 4 layer spatial multiplexing, since RI=4 cannot be reported, 4 layer spatial multiplexing cannot be performed.

The above-mentioned problem on RI is not a problem limited RI, and is a problem that may occur for other uplink control information (UCI).

The present invention is especially contrived in view of the problem on the RI in the above-mentioned problems, and an object of the present invention is to provide a technique for enabling a user apparatus to properly determine a bit width of uplink control information in a mobile communication system including the user apparatus and a base station.

Means for Solving the Problem

According to an embodiment of the present invention, there is provided a user apparatus configured to perform communication with a base station in a mobile communication system that supports downlink spatial multiplexing, including:

transmission means configured to transmit capability information of the user apparatus to the base station;

reception means configured to receive a parameter indicating a transmission mode from the base station;

bit width determination means configured, if the parameter is a predetermined parameter corresponding to the downlink spatial multiplexing and if the capability information includes the number of MIMO layers for the transmission mode, to determine a bit width for transmitting uplink control information based on the number of MIMO layers.

According to an embodiment of the present invention, there is provided a user apparatus configured to perform communication with a base station in a mobile communication system that supports downlink spatial multiplexing, including:

transmission means configured to transmit capability information of the user apparatus to the base station;

reception means configured to receive configuration information from the base station;

bit width determination means configured, if a parameter indicating a transmission mode corresponding to the downlink spatial multiplexing and predetermined additional information are received as the configuration information and if the capability information includes the number of MIMO layers for the transmission mode, to determine a bit width for transmitting uplink control information based on the number of MIMO layers.

According to an embodiment of the present invention, there is provided a user apparatus configured to perform communication with a base station in a mobile communication system that supports downlink spatial multiplexing, including:

transmission means configured to transmit capability information of the user apparatus to the base station;

reception means configured to receive configuration information from the base station;

bit width determination means configured, if a parameter indicating a transmission mode corresponding to the downlink spatial multiplexing and predetermined additional information are received as the configuration information and if the capability information includes the number of MIMO layers for the transmission mode, to determine a bit width for transmitting uplink control information based on the predetermined additional information.

According to an embodiment of the present invention, there is provided an uplink control information bit width determination method executed by a user apparatus configured to perform communication with a base station in a mobile communication system that supports downlink spatial multiplexing, including:

a transmission step of transmitting capability information of the user apparatus to the base station;

a reception step of receiving a parameter indicating a transmission mode from the base station;

a bit width determination step of, if the parameter is a predetermined parameter corresponding to the downlink spatial multiplexing and if the capability information includes the number of MIMO layers for the transmission mode, determining a bit width for transmitting uplink control information based on the number of MIMO layers.

According to an embodiment of the present invention, there is provided a user apparatus configured to perform communication with a base station in a mobile communication system that supports downlink spatial multiplexing, including:

transmission means configured to transmit capability information of the user apparatus to the base station;

reception means configured to receive configuration information from the base station;

bit width determination means configured, if a parameter indicating a transmission mode corresponding to the downlink spatial multiplexing and predetermined additional information are received as the configuration information, to determine a bit width of a rank indicator based on the predetermined additional information.

According to an embodiment of the present invention, there is provided an uplink control information bit width determination method executed by a user apparatus configured to perform communication with a base station in a mobile communication system that supports downlink spatial multiplexing, including:

a transmission step of transmitting capability information of the user apparatus to the base station;

a reception step of receiving configuration information from the base station;

a bit width determination step of, if a parameter indicating a transmission mode corresponding to the downlink spatial multiplexing and predetermined additional information are received as the configuration information and if the capability information includes the number of MIMO layers for the transmission mode, determining a bit width for transmitting uplink control information based on the number of MIMO layers.

According to an embodiment of the present invention, there is provided an uplink control information bit width determination method executed by a user apparatus configured to perform communication with a base station in a mobile communication system that supports downlink spatial multiplexing, including:

a transmission step of transmitting capability information of the user apparatus to the base station;

a reception step of receiving configuration information from the base station;

a bit width determination step of, if a parameter indicating a transmission mode corresponding to the downlink spatial multiplexing and predetermined additional information are received as the configuration information and if the capability information includes the number of MIMO layers for the transmission mode, determining a bit width for transmitting uplink control information based on the predetermined additional information.

According to an embodiment of the present invention, there is provided an uplink control information bit width determination method executed by a user apparatus configured to perform communication with a base station in a mobile communication system that supports downlink spatial multiplexing, including:

a transmission step of transmitting capability information of the user apparatus to the base station;

a reception step of receiving configuration information from the base station;

a bit width determination step of, if a parameter indicating a transmission mode corresponding to the downlink spatial multiplexing and predetermined additional information are received as the configuration information, determining a bit width of a rank indicator based on the predetermined additional information.

Effect of the Present Invention

It becomes possible that a user apparatus properly determines a bit width of uplink control information in a mobile communication system including the user apparatus and a base station.

BRIEF DESCRIPTION OF THE DRAWINGS

FIG. 1 is a diagram showing a part of information elements of UE-EUTRA-Capability;

FIG. 2 is a diagram for explaining a problem;

FIG. 6 is a diagram showing a change example of a standard specification in the operation example 1;

FIG. 7A is a diagram showing a change example of a standard specification in the operation example 1;

FIG. 7B is a diagram showing a change example of a standard specification in the operation example 1;

FIG. 8 is a diagram for explaining an RI bit width determination method of the user apparatus UE in the operation example 1;

FIG. 9 is a diagram showing an example of an RI bit width;

FIG. 10 is a diagram showing a change example of a standard specification in the operation example 1;

FIG. 11A is a diagram showing a change example of a standard specification in the operation example 1;

FIG. 11B is a diagram showing a change example of a standard specification in the operation example 1;

FIG. 12 is a diagram for explaining a soft buffer size determination method of the user apparatus UE in an operation example 2;

FIG. 13 is a diagram showing a change example of a standard specification in the operation example 2;

FIG. 14A is a diagram showing a change example of a standard specification in the operation example 2;

FIG. 14B is a diagram showing a change example of a standard specification in the operation example 2;

FIG. 14C is a diagram showing a change example of a standard specification in the operation example 2;

FIG. 15A is a diagram showing a change example of a standard specification in the operation example 2;

FIG. 15B is a diagram showing a change example of a standard specification in the operation example 2;

FIG. 17 is a diagram showing a change example of a standard specification in the operation example 2;

FIG. 19 is a diagram showing a change example of a standard specification in the operation example 3;

FIG. 20A is a diagram showing a change example of a standard specification in the operation example 3;

FIG. 20B is a diagram showing a change example of a standard specification in the operation example 3;

FIG. 20C is a diagram showing a change example of a standard specification in the operation example 3;

FIG. 22 is a diagram showing a change example of a standard specification in the operation example 3;

FIG. 24 is a diagram showing a change example of a standard specification in the operation example 4;

FIG. 25A is a diagram showing a change example of a standard specification in the operation example 4;

FIG. 25B is a diagram showing a change example of a standard specification in the operation example 4;

FIG. 25C is a diagram showing a change example of a standard specification in the operation example 4;

FIG. 26 is a diagram for explaining an RI bit width determination method of the user apparatus UE in the operation example 4;

FIG. 27 is a diagram showing a change example of a standard specification in the operation example 4;

EMBODIMENTS FOR CARRYING OUT THE INVENTION

In the following, an embodiment of the present invention is described with reference to figures. The embodiment described below is merely an example, and the embodiment to which the present invention is applied is not limited to the embodiment below. For example, although it is assumed that the communication system of the present embodiment supports LTE including LTE-Advanced, the present invention can be applied not only to LTE but also to other schemes performing spatial multiplexing based on MIMO technology.

Also, CA (carrier aggregation) in the present embodiment includes not only Intra-eNB CA but also Inter-eNB CA such as DC (Dual connectivity). In the present embodiment, "CC" and "cell" can be considered to be synonymous basically, so that "CC" may be called "cell" (serving cell, more specifically).

(System Whole Configuration, Operation Outline)

Figure 3:
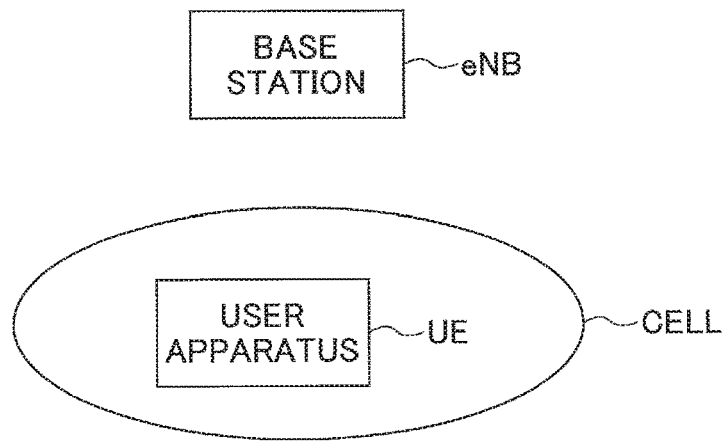
FIG. 3 is a block diagram of a communication system according to an embodiment of the present invention.

FIG. 3 shows a block diagram of a communication system in an embodiment of the present invention. The communication system of the present embodiment is a communication system of the LTE scheme, and includes a user apparatus UE and a base station eNB as shown in FIG. 3. The user apparatus UE and the base station eNB can perform spatial multiplexing communication such as 2×2 MIMO, 4×4 MIMO and the like, and CA. The base station eNB can form a plurality of cells by itself, and also can form a plurality of cells, by remotely connecting an RRE (remote radio equipment) for example, by the main body of the base station eNB and the RRE. Although FIG. 3 shows one user apparatus UE and one base station eNB, this is an example, and a plurality of user apparatuses UE and a plurality of base stations eNB may be provided. Also, the user apparatus UE may be provided with capability (Dual connectivity) for performing communication with a plurality of base stations eNB simultaneously.

When CA is performed, a PCell (Primary cell) that is a reliable cell for ensuring connectivity and an SCell (Secondary cell) that is an appendant cell are set for the user apparatus UE. The user apparatus UE connects to a PCell first, and then, an SCell can be added as necessary. The PCell is a cell similar to an independent cell for supporting RLM (Radio Link Monitoring) and SPS (Semi-Persistent Scheduling) and the like. Addition and deletion of the SCell is performed by RRC (Radio Resource Control) signaling. Since an SCell is in a deactivated state right after it is set in the user apparatus UE, communication becomes available (scheduling becomes available) only by activating it.

When performing Dual connectivity, the user apparatus UE performs communication simultaneously using radio resources of two physically different base stations eNB. Dual connectivity is a kind of CA, and it is also referred to as Inter eNB CA (inter base station carrier aggregation), in which Master-eNB (MeNB) and Secondary-eNB (SeNB) are introduced. In DC, a cell group formed by cell(s) (one or a plurality of cells) under an MeNB is called MCG (Master Cell Group), and a cell group formed by cell(s) (one or a plurality of cells) under a SeNB is called SCG (Secondary Cell Group). An UL CC is set in at least one SCell in an SCG, and PUCCH is set in one of the SCells. The SCell is called PSCell (primary SCell).

Figure 4:
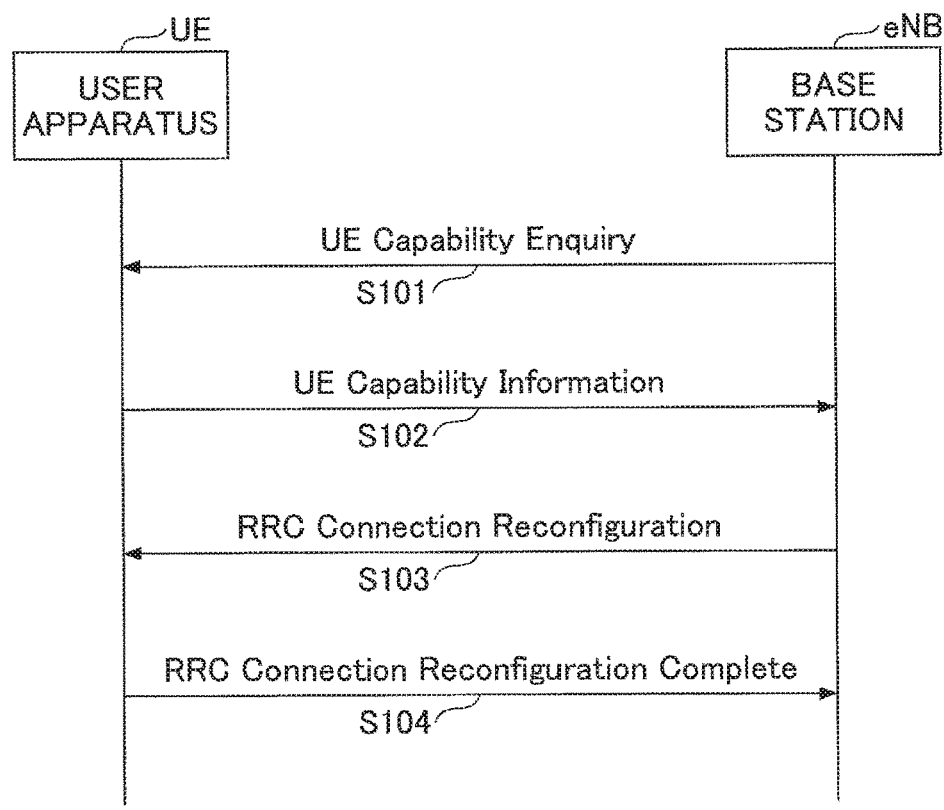
FIG. 4 is a diagram showing a basic operation example of a communication system according to an embodiment of the present invention.

As a basic operation in the present embodiment, there are notification of UE capability information (UE capability) for notifying the base station of capability of the user apparatus UE from the user apparatus UE, and notification of RRC-ConnectionReconfiguration for notifying the user apparatus UE of various configuration information (configuration) on RRC connection and the like from the base station eNB. These notification operation examples are described with reference to FIG. 4. As shown in FIG. 4, the user apparatus UE receives UE capability information request (UE capability enquiry) transmitted from the base station eNB in step S101. The user apparatus UE transmits UE capability information (UE capability information) to the base station eNB based on the UE capability information request (step S102). The UE capability information of the present embodiment includes a UE category, the (maximum) number of downlink MIMO layers supported for each CC.

In step S103, RRCConnectionReconfiguration is notified from the base station eNB to the user apparatus UE. The user apparatus UE that receives RRCConnectionReconfiguration performs setting (storing) of various notified configurations, and transmits RRCConnectionReconfigurationComplete to the base station eNB in step S104. The RRCConnectionReconfiguration includes a parameter and the like of a transmission mode (TM).

Also, as basic operation of the user apparatus UE, there is transmission of uplink control information (UCI, hereinafter). As the UCI, there are ACK/NACK (hybrid ARQ transmittal confirmation), scheduling request, and channel state information (CSI, hereinafter) and the like. As the CSI, there are CQI, PMI, RI and the like. The present embodiment especially focuses on transmission of an RI in the CSI. However, the technique of the present embodiment can be also applied to UCI other than the RI.

As for CSI reporting, there are periodic reporting and aperiodic reporting. For the periodic reporting, a PUCCH is normally used. However, when there is data transmission by a PUSCH at a periodic reporting timing, there is a case where the PUSCH is used. Also, aperiodic reporting is performed by a PUSCH based on a request from a scheduling grant from the base station eNB.

The target of CSI reporting is for each downlink CC (cell). For example, in downlink CA including a downlink CC1 and a downlink CC2, the user apparatus UE obtains an RI1 by measurement of a reference signal (example: CSI-RS) that is received in the downlink CC1 and reports the RI1 to the base station eNB as an RI for the CC1, and the user apparatus UE obtains an RI2 by measurement of a CSI-RS that is received in the downlink CC2 and reports the RI2 to the base station eNB as an RI for the CC2.

In the following, an operation example 1, an operation example 2, an operation example 3, and an operation example 4 in the present embodiment are described in detail.

Operation Example 1

As described before, in the conventional technique, in the case where the user apparatus UE is configured with TM3/4 (TM3 or TM4), the user apparatus UE uses a soft buffer size of category 4 even though the user apparatus UE has capability of 4 layer reception. Thus, there is a problem in that quality may be deteriorated in an environment where HARQ retransmission occurs.

Therefore, in the operation example 1, a new TM is newly introduced as a parameter to enable proper determination of a soft buffer size according to the parameter. In the operation example 1, parameters of the new TM are tm3-rank4-v12xy corresponding to TM3 and tm4-rank4-v12xy corresponding to TM4.

Also, the new TM is a TM that enables to properly execute MIMO communication of up to rank 4, this can be referred to as a TM for "TM3/4 up to rank4".

Operation of the user apparatus UE on determination of a soft buffer size when using the new TM is described with reference to FIG. 5.

In step S301, the user apparatus UE transmits, to the base station eNB, a UE capability including a UE category and the number of supported downlink MIMO layers. In step S302, the user apparatus UE receives a TM (included in RRCConnectionReconfiguration) from the base station eNB. The base station eNB has determined the TM to be configured in the user apparatus UE based on the UE category, the number of downlink MIMO layers and the like received in step S301.

In step S303, the user apparatus UE determines whether the UE category of the user apparatus UE itself is on or after UE category 6 and the user apparatus UE has received (configured) tm3/4-rank4-v12xy which is the new TM.

When the determination result of step S303 is Yes, the user apparatus UE calculates a soft buffer size ($N_{IR}$) by using the total number of soft channel bits ($N_{soft}$) corresponding to the UE category of the user apparatus UE (category on or after category 6) (step S304). When the determination result in step S303 is No, the user apparatus UE calculates a soft buffer size according to an existing rule (non-patent document 4, and the like) (step S305).

The user apparatus UE executes data reception processing such as HARQ control using a soft buffer of the soft buffer size calculated in the above-mentioned way.

FIG. 6 is a diagram showing a change example (excerpt) of a standard specification in the operation example 1. FIG. 6 shows a change example of the non-patent document 4 (3GPP TS 36.212). Parts related to the change are underlined. In FIG. 6, as described as "if the UE signals ue-Category-v1020, and is configured with transmission mode 9, transmission mode 10, transmission mode 3 up to rank 4 or transmission mode 4 up to rank 4 for the DL cell, $N_{soft}$ is the total number of soft channel bits [4] according to the UE category indicated by ue-Category-v1020 [6].", in the operation example 1, if the UE user apparatus is configured with the TM3/4 for up to rank4 for a downlink cell (serving cell), the user apparatus UE calculates a soft buffer size using the total number of soft channel bits corresponding to the UE category indicated by ue-Category-v1020 (that is, a UE category on or after UE category 6).

FIGS. 7A and 7B show a change example of the non-patent document 2 (3GPP TS 36.331) in the operation example 1. As shown in FIGS. 7A and 7B, the above-mentioned tm3-rank4-v12xy and tm4-rank4-v12xy are added.

As described before, in the conventional technique, in the case where the user apparatus UE is configured with TM3/4 (TM3 or TM4), even when the user apparatus UE has capability for performing 4 layer reception, a case occurs where the user apparatus UE cannot notify of a value of an RI corresponding to the capability of the user apparatus UE itself.

In the operation example 1, as described above, a new TM is introduced, and further, the number of MIMO layers supported for TM3/4 up to rank4 is introduced as information of the UE capability, so that the user apparatus UE can properly notify of a value of an RI.

Operation on determination of an RI bit width of the user apparatus UE is described with reference to a flowchart of FIG. 8.

Figure 5:
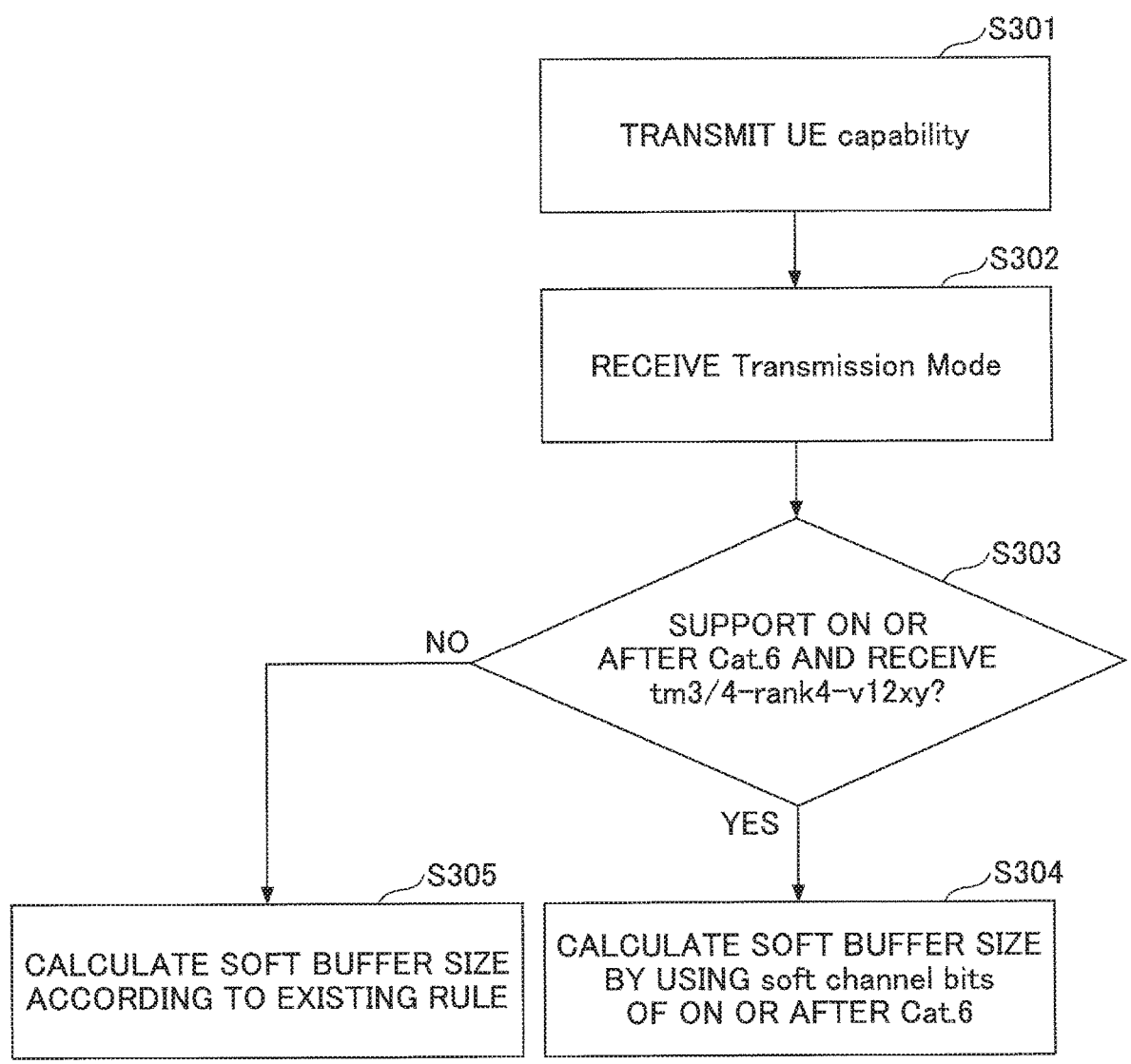
FIG. 5 is a diagram for explaining a soft buffer size determination method of the user apparatus UE in an operation example 1.

Steps S401 and S402 are the same as steps S301 and S302 in FIG. 5.

In step S403, the user apparatus UE determines whether the user apparatus UE has notified of the number of downlink MIMO layers for TM3/4 up to rank4 by including it in the UE capability and the user apparatus UE has received (configured) tm3/4-rank4-v12xy. Notifying of the number of MIMO layers for TM3/4 up to rank4 as the UE capability means that the user apparatus UE supports MIMO communication for TM3/4 up to rank4.

When the determination result in step S403 is Yes, the user apparatus UE determines an RI bit width using, as the maximum number of layers, the minimum value of the number of antenna ports of PBCH and the notified number of MIMO layers (step S404). Here, the number of antenna ports of PBCH is a value that can be calculated based on MIB that the user apparatus UE receives from the base station eNB. For example, assuming that the number of antenna ports of PBCH is 4 and the notified number of MIMO layers is 2, the maximum number of layers is 2, so that the RI bit width is determined from this 2. The RI bit width is determined from a predetermined table (example: FIG. 9). As shown in FIG. 9, when the maximum number of layers is 2, the bit width is determined as 1.

When the determination result in step S403 is No, the user apparatus UE determines the RI bit width according to an existing rule (non-patent document 4 and the like) (step S405).

FIG. 10 is a diagram showing a change example (excerpt) of a standard specification in the operation example 1. FIG. 10 shows a change example of the non-patent document 4 (3GPP TS 36.212). Parts related to the change are underlined. In FIG. 10, as described as "If the UE is configured with transmission mode 3 or 4 up to Rank4 operation, and the supportedMIMO-TM3 (or 4)-CapabilityDL-r12 field is included in the UE-EUTRA-Capability, the maximum number is determined according to the minimum of the number of PBCH antenna ports and the reported UE downlink MIMO capabilities in the supportedMIMO-TM3 (or 4)-CapabilityDL-r12 field for the same band in the corresponding band combination.", in the operation example 1, if the user apparatus UE is configured with TM3/4 up to Rank4 and "supportedMIMO-TM3 (or4)-CapabilityDL-r12" is included in the UE-EUTRA-Capability, the user apparatus UE determines the maximum number of layers for determining the RI bit width based on the number of PBCH antenna ports and the notified number of downlink MIMO layers.

FIGS. 11A and 11B show a change example of the non-patent document 2 (3GPP TS 36.331) in the operation example 1. As shown in FIGS. 11A and 11B, supportedMIMO-TM3/4-CapabilityDL-r12 indicating the maximum number of downlink MIMO layers that the UE supports is added. As to addition of supportedMIMO-TM3/4-CapabilityDL-r12 shown in FIGS. 11A and 11B, same applies to operation examples 2-4 described below. Although the number of MIMO layers is reported for each of TM3 and TM4 in the present embodiment, one signalling including TM3 and TM4 may be used. In this case, it is assumed that the number of MIMO layers is the same between TM3 and TM4.

Operation Example 2

Next, the operation example 2 is described. In the operation example 1, a new TM is newly introduced as a parameter. On the other hand, in the operation example 2, by adding rank4-enabled which is a new information element to the existing TM3 and TM4, the user apparatus UE is configured with operation of up to rank 4.

Operation of the user apparatus UE on determination of a soft buffer size is described with reference to a flowchart of FIG. 12 in the case where the new information element is used.

In step S501, the user apparatus UE transmits, to the base station eNB, a UE capability including a UE category and the number of supported downlink MIMO layers. In step S502, the user apparatus UE receives a TM (included in RRCConnectionReconfiguration) from the base station eNB. In the operation example 2, the above-mentioned information element is added to the TM. The base station eNB has determined the TM (+additional information element) to be configured in the user apparatus UE based on the UE category, the number of downlink MIMO layers and the like received in step S501.

In step S503, the user apparatus UE determines whether the UE category of the user apparatus UE itself is on or after UE category 6 and the user apparatus UE has received TM3/4 and rank4-enabled.

When the determination result of step S503 is Yes, the user apparatus UE calculates a soft buffer size ($N_{IR}$) by using the total number of soft channel bits ($N_{soft}$) corresponding to the UE category of the user apparatus UE (category on or after category 6) (step S504). When the determination result in step S503 is No, the user apparatus UE calculates a soft buffer size according to an existing rule (non-patent document 4, and the like) (step S505).

The user apparatus UE executes HARQ control and the like in data reception using a soft buffer of the soft buffer size calculated in the above-mentioned way.

FIG. 13 is a diagram showing a change example (excerpt) of a standard specification in the operation example 2. FIG. 13 shows a change example of the non-patent document 4 (3GPP TS 36.212). Parts related to the change are underlined. In FIG. 13, as described as "if the UE signals ue-Category-v1020, and is configured with transmission mode 3 or transmission mode 4, and is configured by higher layers with rank4-enabled-r12 for the DL cell, $N_{soft}$ is the total number of soft channel bits [4] according to the UE category indicated by ue-Category-v1020 [6].", in the operation example 2, if the user apparatus UE is configured with TM3/4 and rank4-enabled for a downlink cell (serving cell), the user apparatus UE calculates a soft buffer size using the total number of soft channel bits corresponding to the UE category indicated by ue-Category-v1020 (that is, a UE category on or after UE category 6).

FIGS. 14A~C and FIGS. 15A, B show a change example of the non-patent document 2 (3GPP TS 36.331) in the operation example 2. As shown in FIGS. 14A~C and FIGS. 15A, B, the rank4-enabled indicating that up to rank4 operation in TM3/4 is available is added.

As to determination of an RI bit width, in the operation example 2, as described above, the rank4-enabled added to the existing TM3/4 is introduced, and further, the number of MIMO layers supported for TM3/4 up to rank4 is introduced in the UE capability, so that the user apparatus UE can properly notify of a value of an RI.

Figure 16:
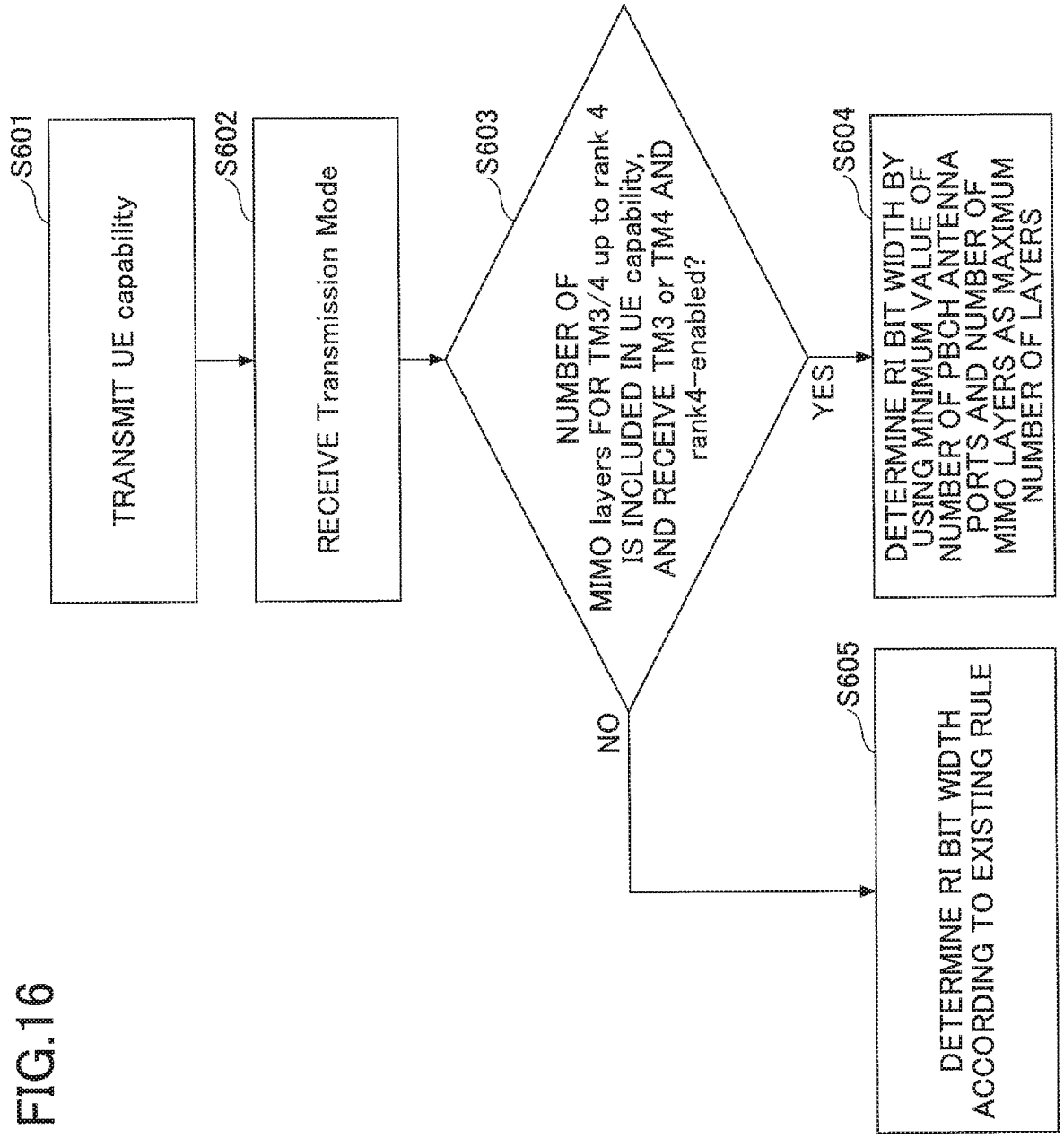
FIG. 16 is a diagram for explaining an RI bit width determination method of the user apparatus UE in the operation example 2.

Operation on determination of an RI bit width of the user apparatus UE in the operation example 2 is described with reference to a flowchart of FIG. 16.

Steps S601 and S602 are the same as steps S501 and S502 in FIG. 12.

In step S603, the user apparatus UE determines whether the user apparatus UE has notified of the number of downlink MIMO layers for TM3/4 up to rank4 by including it in the UE capability and the user apparatus UE has received (configured) TM3/4 and rank4-enabled.

When the determination result in step S603 is Yes, the user apparatus UE determines an RI bit width using, as the supported maximum number of layers, the minimum value of the number of antenna ports of PBCH and the notified number of MIMO layers (step S604). The method for determining an RI bit width from the maximum number of layers is the same as the method described in the operation example 1.

When the determination result in step S603 is No, the user apparatus UE determines the RI bit width according to an existing rule (non-patent document 4 and the like) (step S605).

FIG. 17 is a diagram showing a change example (excerpt) of a standard specification in the operation example 2. FIG. 17 shows a change example of the non-patent document 4 (3GPP TS 36.212). Parts related to the change are underlined. In FIG. 17, as described as "If the UE is configured with transmission mode 3 or 4, and is configured by higher layers with rank4-enabled-r12 for the DL cell, and the supportedMIMO-TM3 (or 4)-CapabilityDL-r12 field is included in the UE-EUTRA-Capability, the maximum number is determined according to the minimum of the number of PBCH antenna ports and the reported UE downlink MIMO capabilities in the supportedMIMO-TM3 (or 4)-CapabilityDL-r12 field for the same band in the corresponding band combination.", in the operation example 2, if the user apparatus UE is configured with TM3/4 and rank4-enabled and "supportedMIMO-TM3 (or4)-CapabilityDL-r12" is included in the UE-EUTRA-Capability, the user apparatus UE determines the maximum number of layers for determining the RI bit width based on the number of PBCH antenna ports and the notified number of downlink MIMO layers.

Operation Example 3

Next, the Operation Example 3 is Described. In the operation example 3, the base station eNB transmits, to the user apparatus UE, for each CC (cell), an information element (maxLayers-RI-report) indicating the maximum number of layers used for determining an RI bit width in the user apparatus UE. Also, the information element has a function similar to that of the rank4-enabled in the operation example 2. That is, in addition to the existing TM3 and TM4, by notifying the user apparatus UE of maxLayers-RI-report, the user apparatus UE is configured with operation of up to rank 4 of TM3/4.

Operation of the user apparatus UE on determination of a soft buffer size is described with reference to a flowchart of FIG. 18 in the case where the new parameter is used.

In step S701, the user apparatus UE transmits, to the base station eNB, a UE capability including a UE category and the number of supported downlink MIMO layers. In step S702, the user apparatus UE receives a TM (included in RRCConnectionReconfiguration) from the base station eNB. In the operation example 3, in step S702, in addition to the TM, maxLayers-RI-report is transmitted from the base station eNB to the user apparatus UE. The base station eNB has determined the TM (+maxLayers-RI-report) to be configured in the user apparatus UE based on the UE category, the number of downlink MIMO layers (for each CC (cell)) and the like received in step S701.

In step S703, the user apparatus UE determines whether the UE category of the user apparatus UE itself is on or after UE category 6 and the user apparatus UE has received TM3/4 and maxLayers-RI-report.

When the determination result of step S703 is Yes, the user apparatus UE calculates a soft buffer size ($N_{IR}$) by using the total number of soft channel bits ($N_{soft}$) corresponding to the UE category of the user apparatus UE (category on or after category 6) (step S704). When the determination result in step S703 is No, the user apparatus UE calculates a soft buffer size according to an existing rule (non-patent document 4, and the like).

The user apparatus UE executes HARQ control and the like in data reception using a soft buffer of the soft buffer size calculated in the above-mentioned way.

FIG. 19 is a diagram showing a change example (excerpt) of a standard specification in the operation example 3. FIG. 19 shows a change example of the non-patent document 4 (3GPP TS 36.212). Parts related to the change are underlined. In FIG. 19, as described as "if the UE signals ue-Category-v1020, and is configured with transmission mode 3 or transmission mode 4, and is configured by higher layers with maxLayers-RI-report-r12 for the DL cell, $N_{soft}$ is the total number of soft channel bits [4] according to the UE category indicated by ue-Category-v1020 [6].", in the operation example 3, if the UE user apparatus UE is configured with TM3/4 and maxLayers-RI-report for a downlink cell (serving cell), the user apparatus UE calculates a soft buffer size using the total number of soft channel bits corresponding to the UE category indicated by ue-Category-v1020 (that is, a UE category on or after UE category 6).

FIGS. 20A~C show a change example of the non-patent document 2 (3GPP TS 36.331) in the operation example 3. As shown in FIGS. 20A~C, the maxLayers-RI-report indicating the number of MIMO layers used for determining an RI bit width is added. FIG. 20C shows an example of addition of signalling for enabling notification of maxLayers-RI-report to each of a PCell and an SCell.

As to determination of an RI bit width, in the operation example 3, as described above, the maxLayers-RI-report added to the existing TM3/4 is introduced, and further, the number of MIMO layers supported for TM3/4 up to rank4 is introduced in the UE capability, so that the user apparatus UE can properly notify of a value of an RI.

Figure 21:
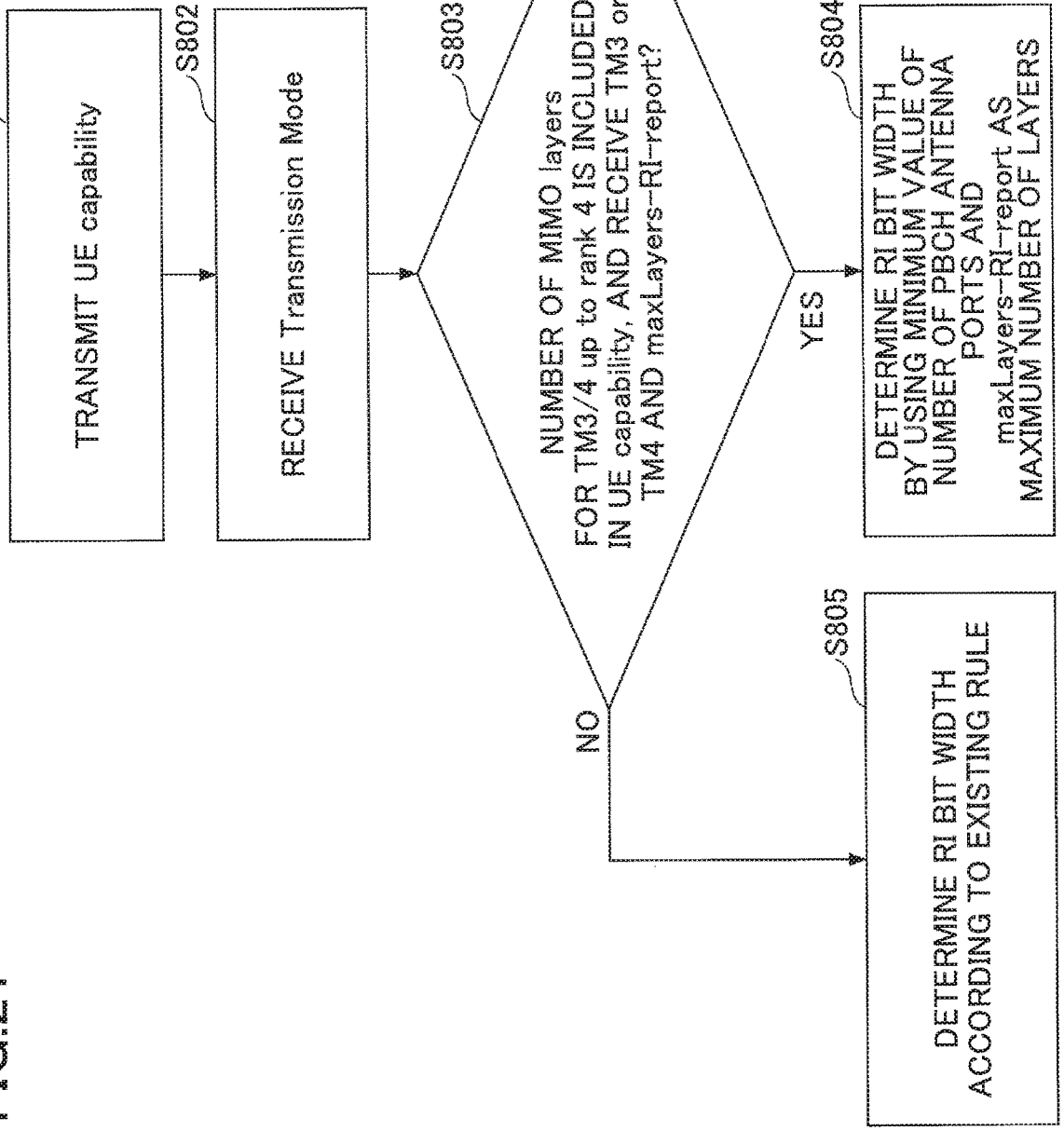
FIG. 21 is a diagram for explaining an RI bit width determination method of the user apparatus UE in the operation example 3.

Operation on determination of an RI bit width of the user apparatus UE in the operation example 3 is described with reference to a flowchart of FIG. 21.

Figure 18:
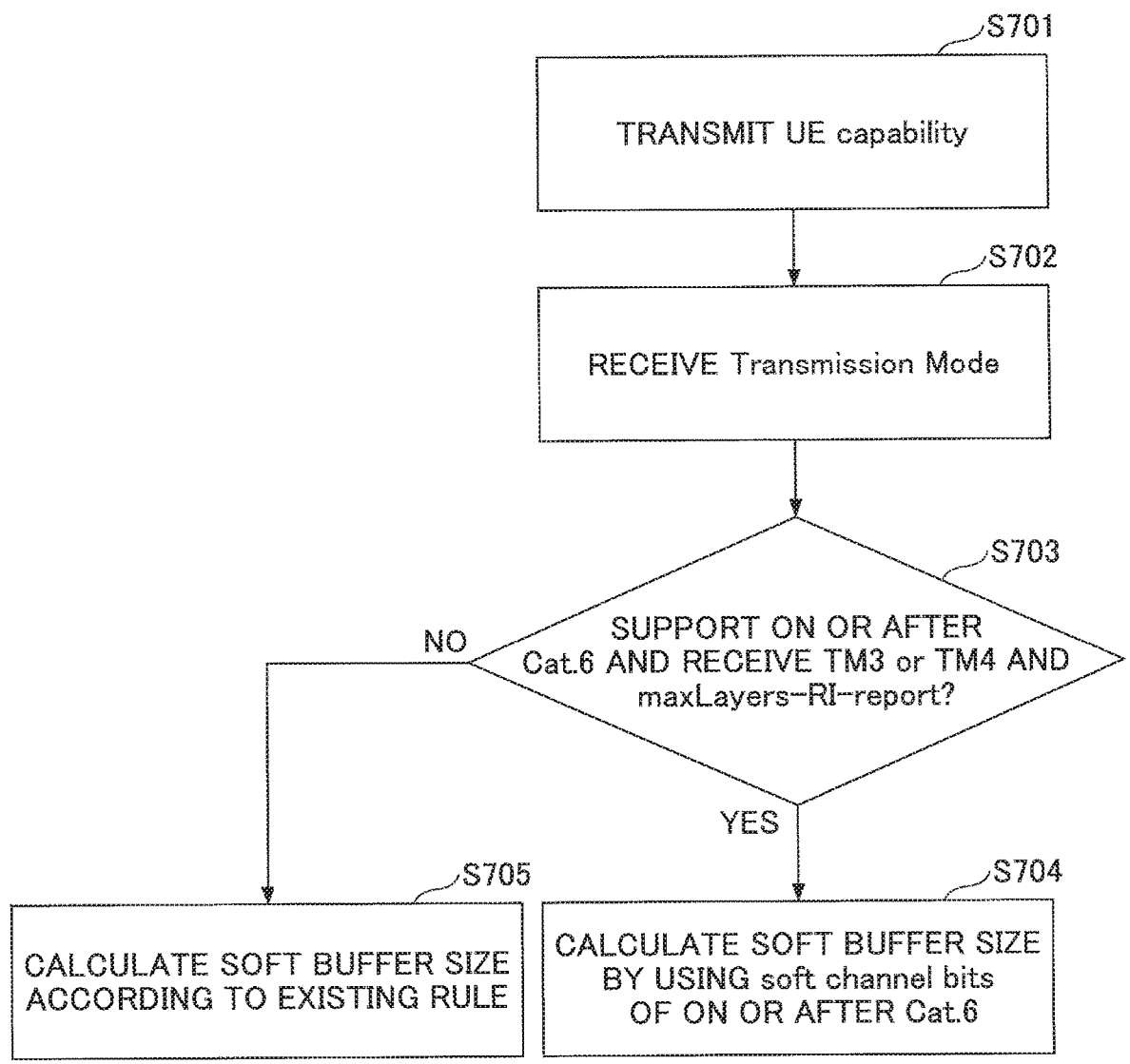
FIG. 18 is a diagram for explaining a soft buffer size determination method of the user apparatus UE in an operation example 3.

Steps S801 and S802 are the same as steps S701 and S702 in FIG. 18.

In step S803, the user apparatus UE determines whether the user apparatus UE has notified of the number of downlink MIMO layers for TM3/4 up to rank4 as the UE capability and the user apparatus UE has received (configured) TM3/4 and maxLayers-RI-report.

When the determination result in step S803 is Yes, the user apparatus UE determines an RI bit width using, as the supported maximum number of layers, the minimum value of the number of antenna ports of PBCH and the value of maxLayers-RI-report (step S804). The method for determining an RI bit width from the maximum number of layers is the same as the method described in the operation example 1.

When the determination result in step S803 is No, the user apparatus UE determines the RI bit width according to an existing rule (non-patent document 4 and the like) (step S805).

FIG. 22 is a diagram showing a change example (excerpt) of a standard specification in the operation example 3. FIG. 22 shows a change example of the non-patent document 4 (3GPP TS 36.212). Parts related to the change are underlined. In FIG. 22, as described as "If the UE is configured with transmission mode 3 or 4, and is configured by higher layers with maxLayers-RI-report-r12 for the DL cell, and the supportedMIMO-TM3 (or 4)-CapabilityDL-r12 field is included in the UE-EUTRA-Capability, the maximum number is determined according to the minimum of the number of PBCH antenna ports and the configured maxLayers-RI-report-r12 field for the same band in the corresponding band combination.", in the operation example 3, if the user apparatus UE is configured with TM3/4 and maxLayers-RI-report and "supportedMIMO-TM3 (or4)-CapabilityDL-r12" is included in the UE-EUTRA-Capability, the user apparatus UE determines the maximum number of layers for determining the RI bit width based on the number of PBCH antenna ports and the value of the maxLayers-RI-report.

Operation Example 4

Next, the operation example 4 is described. In the operation example 4, the base station eNB transmits, to the user apparatus UE, for each CC (cell), an information element (ue-RI-Bit-Width) indicating an RI bit width used in the user apparatus UE. Also, the information element has a function similar to that of the rank4-enabled in the operation example 2. That is, in addition to the existing TM3 and TM4, by notifying the user apparatus UE of ue-RI-Bit-Width, the user apparatus UE is configured with operation of up to rank 4 of TM3/4.

Operation of the user apparatus UE on determination of a soft buffer size is described with reference to a flowchart of FIG. 23 in the case where the new parameter is used.

In step S901, the user apparatus UE transmits, to the base station eNB, a UE capability including a UE category and the number of supported downlink MIMO layers. In step S902, the user apparatus UE receives a TM (included in RRCConnectionReconfiguration) from the base station eNB. In the operation example 4, in step S902, in addition to the TM, ue-RI-Bit-Width is transmitted from the base station eNB to the user apparatus UE. The base station eNB has determined, for each CC (cell), the TM (+ue-RI-Bit-Width) to be configured in the user apparatus UE based on the UE category, the number of downlink MIMO layers and the like received in step S901.

In step S903, the user apparatus UE determines whether the UE category of the user apparatus UE itself is on or after UE category 6 and the user apparatus UE has received TM3/4 and ue-RI-Bit-Width.

When the determination result of step S903 is Yes, the user apparatus UE calculates a soft buffer size ($N_{IR}$) by using the total number of soft channel bits ($N_{soft}$) corresponding to the UE category of the user apparatus UE (category on or after category 6) (step S904). When the determination result in step S903 is No, the user apparatus UE calculates a soft buffer size according to an existing rule (non-patent document 4, and the like) (step S905).

The user apparatus UE executes HARQ control and the like in data reception using a soft buffer of the soft buffer size calculated in the above-mentioned way.

FIG. 24 is a diagram showing a change example (excerpt) of a standard specification in the operation example 4. FIG. 24 shows a change example of the non-patent document 4 (3GPP TS 36.212). Parts related to the change are underlined. In FIG. 24, as described as "if the UE signals ue-Category-v1020, and is configured with transmission mode 3 or transmission mode 4, and is configured by higher layers with ue-RI-Bit-Width-r12 for the DL cell, $N_{soft}$ is the total number of soft channel bits [4] according to the UE category indicated by ue-Category-v1020 [6].", in the operation example 4, if the UE user apparatus UE is configured with TM3/4 and ue-RI-Bit-Width for a downlink cell (serving cell), the user apparatus UE calculates a soft buffer size using the total number of soft channel bits corresponding to the UE category indicated by ue-Category-v1020 (that is, a UE category on or after UE category 6).

FIGS. 25A~C show a change example of the non-patent document 2 (3GPP TS 36.331) in the operation example 4. As shown in FIGS. 25A-C, the ue-RI-Bit-Width indicating the RI bit width is added. FIG. 25C shows an example of addition of signalling for enabling notification of ue-RI-Bit-Width to each of a PCell and an SCell.

As to determination of an RI bit width, in the operation example 4, as described above, the ue-RI-Bit-Width added to the existing TM3/4 is introduced, and further, the number of MIMO layers supported for TM3/4 up to rank4 is introduced in the UE capability, so that the user apparatus UE can properly notify of a value of an RI.

Operation on determination of an RI bit width of the user apparatus UE in the operation example 4 is described with reference to a flowchart of FIG. 26.

Figure 23:
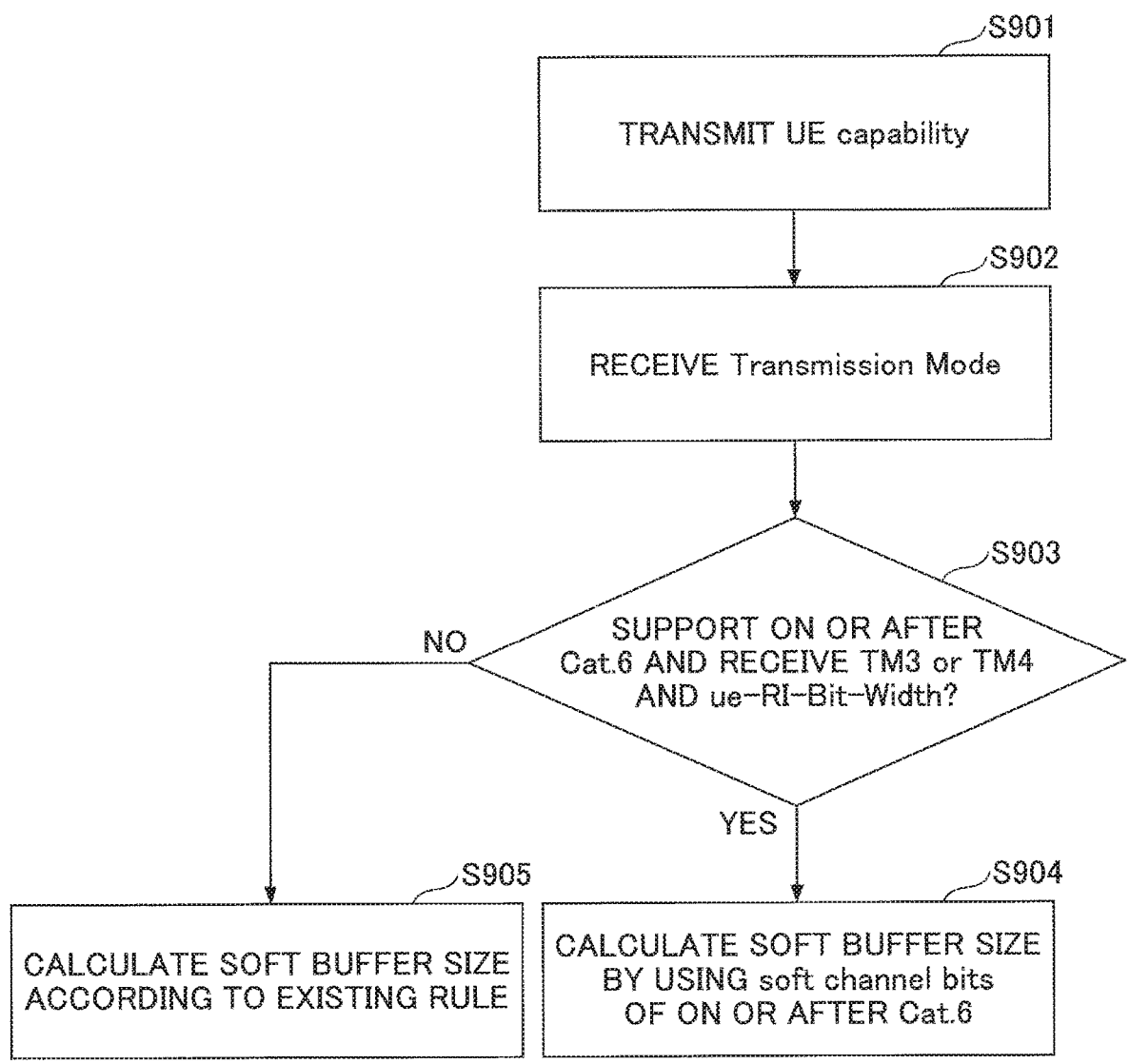
FIG. 23 is a diagram for explaining a soft buffer size determination method of the user apparatus UE in an operation example 4.

Steps S1001 and S1002 are the same as steps S901 and S902 in FIG. 23.

In step S1003, the user apparatus UE determines whether the user apparatus UE has notified of the number of downlink MIMO layers for TM3/4 up to rank4 as the UE capability and the user apparatus UE has received (configured) TM3/4 and ue-RI-Bit-Width.

When the determination result in step S1003 is Yes, the user apparatus UE determines the value of ue-RI-Bit-Width as an RI bit width (step S1004).

When the determination result in step S1003 is No, the user apparatus UE determines the RI bit width according to an existing rule (non-patent document 4 and the like) (step S1005).

FIG. 27 is a diagram showing a change example (excerpt) of a standard specification in the operation example 4. FIG. 27 shows a change example of the non-patent document 4 (3GPP TS 36.212). Parts related to the change are underlined. In FIG. 27, as described as "If the UE is configured with transmission mode 3 or 4, and is configured by higher layers with ue-RI-Bit-Width-r12 for the DL cell, and the supportedMIMO-TM3 (or 4)-CapabilityDL-r12 field is included in the UE-EUTRA-Capability, the RI bit width is determined according to the ue-RI-Bit-Width-r12 value for the DL cell signalled to the UE.", in the operation example 4, if the user apparatus UE is configured with TM3/4 and ue-RI-Bit-Width and "supportedMIMO-TM3 (or4)-CapabilityDL-r12" is included in the UE-EUTRA-Capability, the user apparatus UE determines the RI bit width according to ue-RI-Bit-Width.

(Apparatus Configuration Example)

Next, main configurations of the user apparatus UE and the base station eNB that can execute operation (including the operation example 1, the operation example 2, the operation example 3, and the operation example 4) are described.

Figure 28:
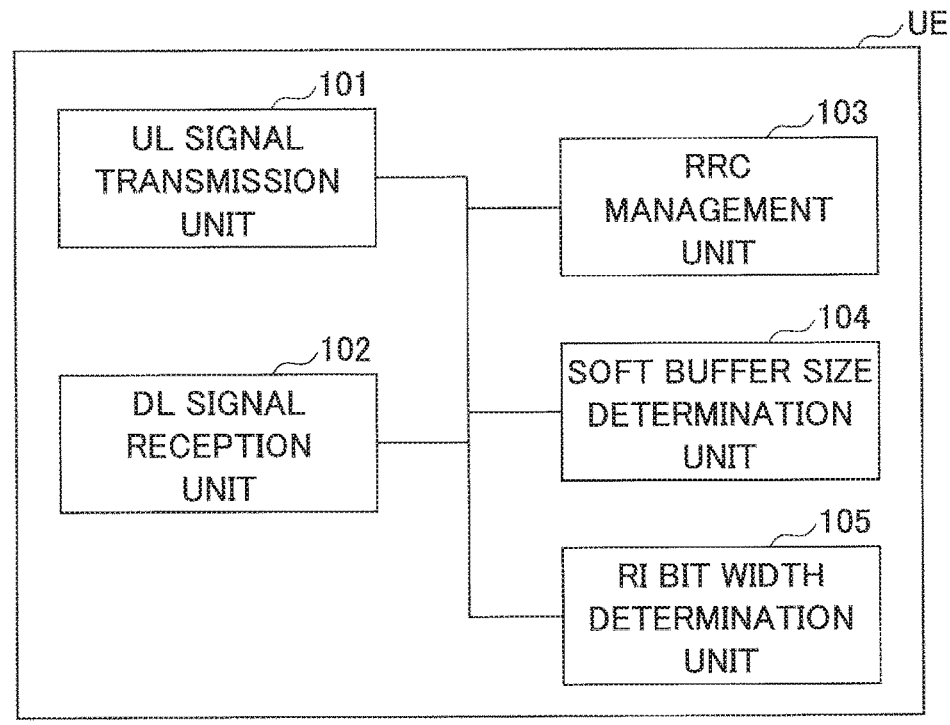
FIG. 28 is a block diagram of the user apparatus UE.

First, FIG. 28 shows a block diagram of the user apparatus UE according to the present embodiment. As shown in FIG. 28, the user apparatus UE includes an UL signal transmission unit 101, a DL signal reception unit 102, an RRC management unit 103, a soft buffer size determination unit 104, and an RI bit width determination unit 105. FIG. 28 only shows functional units especially related to the embodiment of the present invention in the user apparatus UE, and the user apparatus UE also includes at least functions, not shown in the figure, for performing operation complying with LTE. Also, the configuration shown in FIG. 28 is merely an example. Any functional segmentations and any names of functional units can be used as long as the user apparatus UE can execute processing described in the present embodiment. Also, the user apparatus UE may include functions for performing all operations of the operation examples 1, 2, 3 and 4, or may include functions for performing any one operation of the operation examples 1, 2, 3 and 4. Also, the user apparatus UE may include functions for performing operations of a plurality (two or three) of the operation examples 1, 2, 3 and 4. Also, the user apparatus UE may include both of or one of the function for determining a soft buffer size according to the method of the present embodiment and the function for determining an RI bit width according to the method of the present embodiment. In the case where the function for determining the soft buffer size according to the method described in the present embodiment is provided, the RI bit width is properly determined, for example, such that an RI is reported with a sufficient bit width, and the like.

The UL signal transmission unit 101 includes functions configured to generate various signals of physical layer from an upper layer signal to be transmitted from the user apparatus UE, and transmit the signals by radio. The DL signal reception unit 102 includes functions configured to receive various signals from the base station eNB by radio and obtain a signal of an upper layer from the received physical layer signals. Each of the UL signal transmission unit 101 and the DL signal reception unit 102 includes a function configured to execute CA in which communication is performed by bundling a plurality of CCs. Also, the UL signal reception unit 102 includes a function configured to determine a CSI such as an RI by performing measurement of a reference signal, and the UL signal transmission unit 101 includes a function configured to transmit the CSI such as the RI. Also, the DL signal reception unit 102 and the UL signal transmission unit 101 include functions configured to execute HARQ control on data reception using a soft buffer of the size determined by the soft buffer size determination unit 104.

It is assumed that each of the UL signal transmission unit 101 and the DL signal reception unit 102 includes a packet buffer, and performs processing of the layer 1 (PHY) and the layer 2 (MAC, RLC, PDCP). However, it is not limited to this.

The RRC management unit 103 includes functions configured to perform transmission and reception of an RRC message with the base station eNB via the UL signal transmission unit 101/DL signal reception unit 102, and to perform processing of setting/change/management of CA information, configuration change and the like. Also, the RRC management unit 103 holds information of capability of the user apparatus UE, and generates an RRC message for notification of capability information, and transmits it to the base station eNB via the UL signal transmission unit 101.

The soft buffer size determination unit 104 determines a soft buffer size. For example, when executing the operation example 1, the soft buffer size determination unit 104 determines whether the UE category of the user apparatus UE is a UE category on or after UE category 6 and tm3/4-rank4-v12xy is received or not, then, if the determination result is Yes, calculates a soft buffer size ($N_{IR}$) by using the total number of soft channel bits ($N_{soft}$) corresponding to the UE category (category on or after category 6). The user apparatus includes storage means such as a memory, and the storage means stores a table (including the total number of soft channel bits for each UE category) like one shown in FIG. 2. The soft buffer size determination unit 104 obtains the total number of soft channel bits from the table.

When executing the operation example 2, the soft buffer size determination unit 104 determines whether the UE category of the user apparatus UE is a UE category on or after UE category 6 and TM3/4 and rank4-enabled are received or not, then, if the determination result is Yes, calculates a soft buffer size ($N_{IR}$) by using the total number of soft channel bits ($N_{soft}$) corresponding to the UE category (category on or after category 6).

When executing the operation example 3, the soft buffer size determination unit 104 determines whether the UE category of the user apparatus UE is a UE category on or after UE category 6 and TM3/4 and maxLayers-RI-report are received or not, then, if the determination result is Yes, calculates a soft buffer size ($N_{IR}$) by using the total number of soft channel bits ($N_{soft}$) corresponding to the UE category (category on or after category 6).

When executing the operation example 4, the soft buffer size determination unit 104 determines whether the UE category of the user apparatus UE is a UE category on or after UE category 6 and TM3/4 and ue-RI-Bit-Width are received or not, then, if the determination result is Yes, calculates a soft buffer size ($N_{IR}$) by using the total number of soft channel bits ($N_{soft}$) corresponding to the UE category (category on or after category 6).

The RI bit width determination unit 105 calculates an RI bit width for each CC (cell). For example, in the case where the operation example 1 is executed, the RI bit width determination unit 105 determines whether the number of downlink MIMO layers for TM3/4 up to rank4 is notified as the UE capability and tm3/4-rank4-v12xy is received, then, if the determination result is Yes, determines the RI bit width by using, as the maximum number of layers of the corresponding CC (cell), the minimum value of the number of antenna ports of PBCH and the notified number of MIMO layers.

In the case where the operation example 2 is executed, the RI bit width determination unit 105 determines whether the number of downlink MIMO layers for TM3/4 up to rank4 is notified as the UE capability and TM3/4 and rank4-enabled are received, then, if the determination result is Yes, determines the RI bit width by using, as the maximum number of layers of the corresponding CC (cell), the minimum value of the number of antenna ports of PBCH and the notified number of MIMO layers.

In the case where the operation example 3 is executed, the RI bit width determination unit 105 determines whether the number of downlink MIMO layers for TM3/4 up to rank4 is notified as the UE capability, and TM3/4 and maxLayers-RI-report are received, then, if the determination result is Yes, determines the RI bit width by using, as the maximum number of layers of the corresponding CC (cell), the minimum value of the number of antenna ports of PBCH and the value of maxLayers-RI-report.

In the case where the operation example 4 is executed, the RI bit width determination unit 105 determines whether the number of downlink MIMO layers for TM3/4 up to rank4 is notified as the UE capability, and TM3/4 and ue-RI-Bit-Width are received, then, if the determination result is Yes, determines the value of ue-RI-Bit-Width as the RI bit width the corresponding CC (cell).

Figure 29:
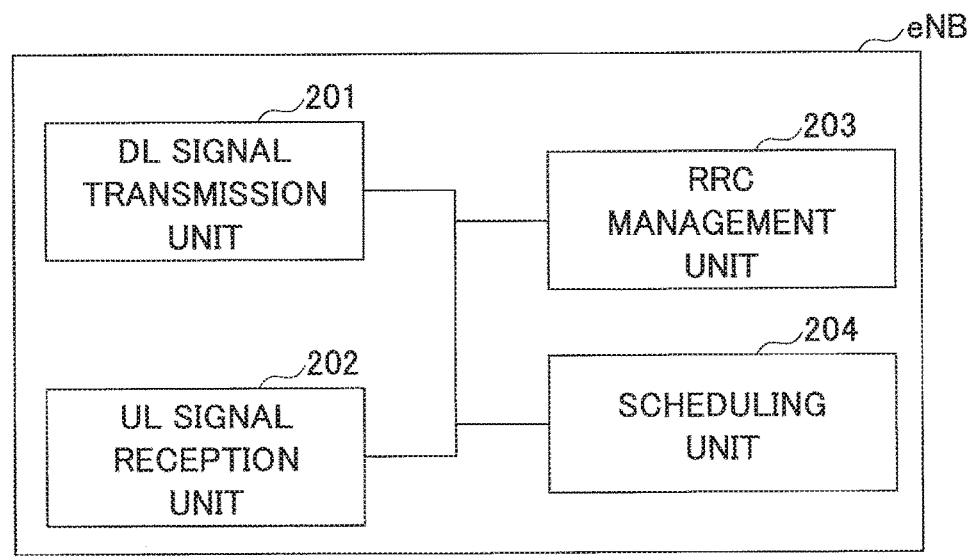
FIG. 29 is a block diagram of the base station eNB.

FIG. 29 shows a block diagram of the base station eNB according to the present embodiment. As shown in FIG. 29, the base station eNB includes a DL signal transmission unit 201, an UL signal reception unit 202, an RRC management unit 203, and a scheduling unit 204. FIG. 29 only shows functional units especially related to the embodiment of the present invention in the base station eNB, and the base station eNB also includes at least functions, not shown in the figure, for performing operation complying with LTE. Also, the configuration shown in FIG. 29 is merely an example. Any functional segmentations and any names of functional units can be used as long as the base station eNB can execute operation described in the present embodiment. The base station eNB may be a single base station eNB, and also, the base station eNB may become either one of an MeNB and an SeNB by configuration when performing DC. Also, the base station eNB may include functions for performing all operations of the operation examples 1, 2, 3 and 4, or may include functions for performing any one operation of the operation examples 1, 2, 3 and 4. Also, the base station eNB may include functions for performing operations of a plurality (two or three) of the operation examples 1, 2, 3 and 4.

The DL signal transmission unit 201 includes functions configured to generate various signals of physical layer from an upper layer signal to be transmitted from the base station eNB, and transmit the signals by radio. The UL signal reception unit 202 includes functions configured to receive various signals from each UE by radio and obtain a signal of an upper layer from the received physical layer signals. Each of the DL signal transmission unit 201 and the UL signal reception unit 202 includes a function configured to execute CA in which communication is performed by bundling a plurality of CCs. Also, each of the DL signal transmission unit 201 and the UL signal reception unit 202 may include a radio communication unit, such as an RRE, that is remotely placed from the main body (control unit) of the base station eNB.

It is assumed that each of the DL signal transmission unit 201 and the UL signal reception unit 202 includes a packet buffer, and performs processing of the layer 1 (PHY) and the layer 2 (MAC, RLC, PDCP). However, it is not limited to this.

The RRC management unit 203 includes functions configured to perform transmission and reception of an RRC message with the user apparatus UE via the DL signal transmission unit 201/UL signal reception unit 202, and to perform processing of setting/change/management of CA, configuration change and the like. Also, the RRC management unit 203 receives capability information from the user apparatus UE via the UL signal reception unit 202, and holds the capability information, so that the RRC management unit 203 can perform configuration and the like of CA and TM for the user apparatus UE. When the operation example 1 is executed, the TM includes the tm3-rank4-v12xy and the tm4-rank4-v12xy. Also, when the operation example 2 is executed, the RRC management unit 203 can notify of the rank4-enabled by adding it to TM3/4.

Also, when the operation example 3 is executed, the RRC management unit 203 determines the value of maxLayers-RI-report based on the number of downlink MIMO layers and the like that is received from the user apparatus UE as the UE capability, and notifies the user apparatus UE of the value by setting it to the maxLayers-RI-report. As an example, when the number of downlink MIMO layers notified from the user apparatus for a CC (cell) is 4, the RRC management unit 203 determines the value of the maxLayers-RI-report as 4. Also, for example, when there is a limitation for the total number of downlink MIMO layers in CA of a plurality of CCs, even when the number of downlink MIMO layers for a CC is 4, there is a case where the RRC management unit 203 determines the value of the maxLayers-RI-report as 2.

Also, when the operation example 4 is executed, the RRC management unit 203 determines the value of ue-RI-Bit-Width based on the number of downlink MIMO layers that is received from the user apparatus UE as the UE capability and the number of PBCH antenna ports used for downlink PBCH transmission by the base station eNB and the like, and notifies the user apparatus UE of the value by setting it to the ue-RI-Bit-Width. As an example, when the number of downlink MIMO layers notified from the user apparatus for a CC (cell) is 4 and the number of PBCH antenna ports is 4, the RRC management unit 203 determines the value of the ue-RI-Bit-Width as 2.

The scheduling unit 204 includes functions and the like configured to perform scheduling for each cell for the user apparatus UE, to generate assignment information of PDCCH, and to instruct the DL signal transmission unit 201 to transmit the PDCCH including the assignment information.

<Hardware Configuration>

The block diagrams (FIG. 28 and FIG. 29) used for the description of the above-described embodiment illustrates blocks in units of functions. These functional blocks (components) are implemented by any combinations of hardware and/or software. Further, a method for implementing each functional block is not particularly limited. Namely, each functional block may be implemented by a single device that is physically and/or logically combined; or may be implemented by a plurality of devices by directly and/or indirectly (e.g., wired and/or wireless) connecting the two or more devices that are physically and/or logically separated.

Figure 30:
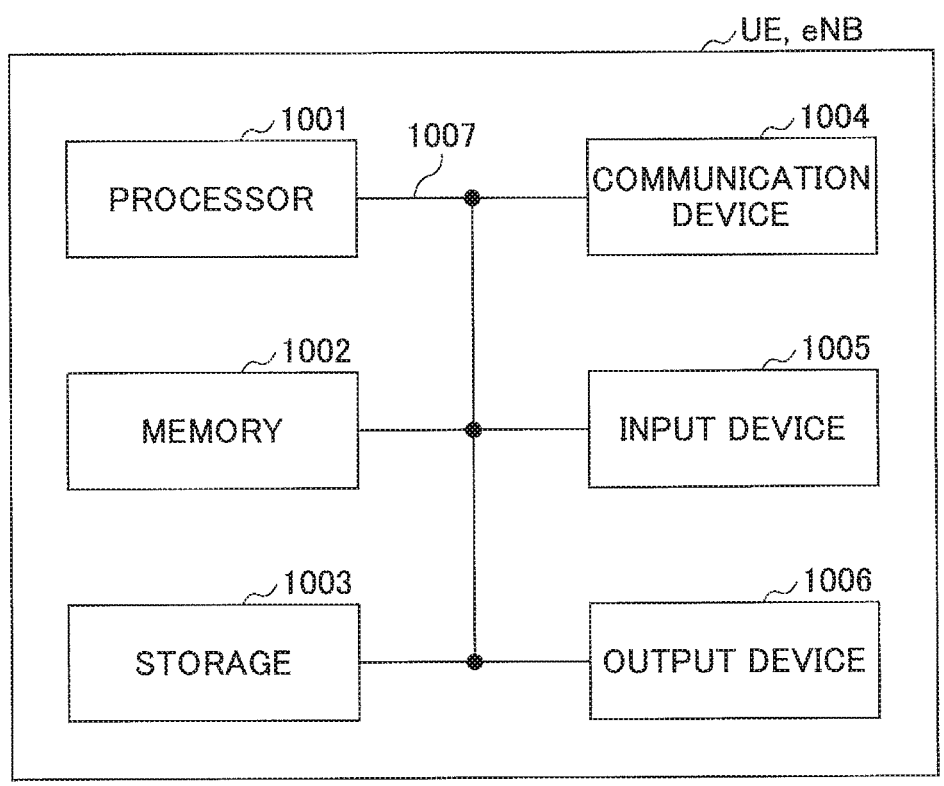
FIG. 30 is a diagram showing an example of a hardware configuration of the base station eNB and the user apparatus UE.

For example, the base station eNB and the user apparatus UE according to the embodiment of the present invention may function as computers for executing the process of the radio communication method according to the present invention. FIG. 30 is a diagram illustrating an example of the hardware configurations of the base station eNB and the user apparatus UE according to the embodiment. Each of the above-described base station eNB and the user apparatus UE may be physically configured as a computer device including a processor 1001: a memory 1002: a storage 1003: a communication device 1004; an input device 1005; an output device 1006; a bus 1007, and so forth.

Note that, in the following description, the wording "device" may be replaced with a circuit, a device, a unit, and so forth. The hardware configurations of the base station eNB and the user apparatus UE may be arranged to include one or more of the devices illustrated in the figure; or may be arranged not to include a part of the devices.

Each function of the base station eNB and the user apparatus UE may be implemented by loading predetermined software (a program) onto hardware, such as a processor 1001 and a memory 1002, so that the processor 1001 performs operation to control communication by the communication device 1004, and reading and/or writing data in the memory 1002 and the storage 1003.

The processor 1001 controls the entire computer, for example, by operating an operating system. The processor 1001 may be formed of a central processing unit (CPU: Central Processing Unit) including an interface with peripheral devices; a controller; a processor, a resister, and so forth. For example, the UL signal transmission unit 101, the DL signal reception unit 102, the RRC management unit 103, the soft buffer size determination unit 104, and the RI bit width determination unit 105 of the user apparatus UE may be implemented by the processor 1001; and the DL signal transmission unit 201, the UL signal reception unit 202, the RRC management unit 203, and the scheduling unit 204 of the base station eNB may be implemented by the processor 1001.

Furthermore, the processor 1001 reads out a program (a program code), a software module, or data from the storage 1003 and/or the communication device 1004 onto the memory 1002; and performs various types of processes according to these. As the program, a program is used which is for causing the computer to execute at least a part of the operation described in the above-described embodiment. For example, the UL signal transmission unit 101, the DL signal reception unit 102, the RRC management unit 103, the soft buffer size determination unit 104, and the RI bit width determination unit 105 of the user apparatus UE may be implemented by a control program that is stored in the memory 1002 and operated by the processor 1001 and the other functional blocks may be implemented in a similar manner; and the DL signal transmission unit 201, the UL signal reception unit 202, the RRC management unit 203, and the scheduling unit 204 of the base station eNB may be implemented by a control program that is stored in the memory 1002 and operated by the processor 1001; and the other functional blocks may be implemented in a similar manner. It is described that the above-described various types of processes are executed by the single processor 1001; however, these can be simultaneously or sequentially executed by two or more processors 1001. The processor 1001 may be implemented by one or more chips. Here, the program may be transmitted from a network via a telecommunication line.

The memory 1002 is a computer readable recording medium; and, for example, it can be formed of at least one of a ROM (Read Only Memory), an EPROM (Erasable Programmable ROM), an EEPROM (Electrically Erasable Programmable ROM), a RAM (Random Access Memory), and so forth. The memory 1002 may be referred to as a resister, a cache, a main memory (a main storage device), and so forth. The memory 1002 can store a program (a program code), a software module, and so forth that can be executed for implementing the communication method according to the embodiment of the present invention.

The storage 1003 is a computer readable recording medium; and, for example, it can be formed of at least one of an optical disk, such as a CD-ROM (Compact Disc ROM); a hard disk drive; a flexible disk; a magneto-optical disk (e.g., a compact disk, a digital versatile disk, a Blu-ray (registered trademark) disk); a smart card; a flash memory (e.g., a card, a stick, a key drive); a Floppy (registered trademark) disk; a magnetic strip, and so forth. The storage 1003 may be referred to as an auxiliary storage device. The above-described storage medium may be, for example, a database including the memory 1002 and/or the storage 1003; a server; or any other suitable medium.

The communication device 1004 is hardware (a transceiver device) for executing communication between computers via a wired and/or wireless network; and, for example, it can be referred to as a network device, a network controller, a network card, a communication module, and so forth. For example, the UL signal transmission unit 101 and the DL signal reception unit 102 of the user apparatus UE may be implemented by the communication device 1004; and the DL signal transmission unit 201 and the UL signal reception unit 202 of the base station eNB may be implemented by the communication device 1004.

The input device 1005 is an input device that receives an input from outside (e.g., a keyboard, a mouse, a microphone, a switch, a button, a sensor, etc.). The output device 1006 is an output device for implementing output toward outside (e.g., a display, a speaker, a LED lamp, etc.). Note that the input device 1005 and the output device 1006 may have an integrated configuration (e.g., a touch panel).

Further, the devices, such as the processor 1001 and the memory 1002, are connected by a bus 1007 for communicating information. The bus 1007 may be formed of a single bus; or may be formed of buses which are different among devices.

Further, each of the base station eNB and the user apparatus UE may be arranged to include hardware, such as a microprocessor, a digital signal processor (DSP: Digital Signal Processor), an ASIC (Application Specific Integrated Circuit), a PLD (Programmable Logic Device), and a FPGA (Field Programmable Gate Array); and a part of or all of the functional blocks may be implemented by the hardware. For example, the processor 1001 may be implemented by at least one of these hardware components.

Summary of Embodiment

According to the present embodiment, there is provided a user apparatus configured to perform communication with a base station in a mobile communication system that supports downlink spatial multiplexing, including:

transmission means configured to transmit category information of the user apparatus to the base station;

reception means configured to receive a parameter indicating a transmission mode from the base station;

soft buffer size determination means configured, if the category information is a value equal to or greater than a predetermined value and if the parameter is a predetermined parameter corresponding to the downlink spatial multiplexing, to determine a soft buffer size corresponding to the category information as a soft buffer size used for downlink data reception processing in the user apparatus.

According to the above configuration, the user apparatus can properly determine a soft buffer size.

According to the present embodiment, there is provided a user apparatus configured to perform communication with a base station in a mobile communication system that supports downlink spatial multiplexing, including:

transmission means configured to transmit category information of the user apparatus to the base station;

reception means configured to receive configuration information from the base station;

soft buffer size determination means configured, if the category information is a value equal to or greater than a predetermined value and if a parameter indicating a transmission mode corresponding to the downlink spatial multiplexing and predetermined additional information are received as the configuration information, to determine a soft buffer size corresponding to the category information as a soft buffer size used for downlink data reception processing in the user apparatus.

According to the above configuration, the user apparatus can properly determine a soft buffer size.

The predetermined additional information is information indicating that the user apparatus can perform spatial multiplexing operation up to a predetermined number of layers. According to this configuration, a soft buffer size can be properly determined by adding information to a parameter of an existing transmission mode.

The predetermined additional information may be, for example, the maximum number of layers used for determining a bit width for transmitting uplink control information. According to this configuration, a soft buffer size can be properly determined by adding information to a parameter of an existing transmission mode. Also, the maximum number of layers can be used for determining an uplink control information bit width.

The predetermined additional information may be a bit width for transmitting uplink control information. According to this configuration, a soft buffer size can be properly determined by adding information to a parameter of an existing transmission mode. Also, predetermined additional information can be used for determining an uplink control information bit width.

The soft buffer size determination means determines the soft buffer size by using the total number of soft channel bits corresponding to the category information, for example. According to this configuration, a soft buffer size can be properly determined.

According to the present embodiment, there is provided a user apparatus configured to perform communication with a base station in a mobile communication system that supports downlink spatial multiplexing, including:

transmission means configured to transmit capability information of the user apparatus to the base station;

reception means configured to receive a parameter indicating a transmission mode from the base station;

bit width determination means configured, if the parameter is a predetermined parameter corresponding to the downlink spatial multiplexing and if the capability information includes the number of MIMO layers for the transmission mode, to determine a bit width for transmitting uplink control information based on the number of MIMO layers.

According to the above configuration, the user apparatus can properly determine a bit width of uplink control information.

According to the present embodiment, there is provided a user apparatus configured to perform communication with a base station in a mobile communication system that supports downlink spatial multiplexing, including:

transmission means configured to transmit capability information of the user apparatus to the base station;

reception means configured to receive configuration information from the base station;

bit width determination means configured, if a parameter indicating a transmission mode corresponding to the downlink spatial multiplexing and predetermined additional information are received as the configuration information and if the capability information includes the number of MIMO layers for the transmission mode, to determine a bit width for transmitting uplink control information based on the number of MIMO layers.

According to the above configuration, the user apparatus can properly determine a bit width of uplink control information.

The predetermined additional information is, for example, information indicating that the user apparatus can perform spatial multiplexing operation up to a predetermined number of layers. According to this configuration, a bit width of uplink control information can be properly determined by adding information to a parameter of an existing transmission mode.

According to the present embodiment, there is provided a user apparatus configured to perform communication with a base station in a mobile communication system that supports downlink spatial multiplexing, including:

transmission means configured to transmit capability information of the user apparatus to the base station;

reception means configured to receive configuration information from the base station;

bit width determination means configured, if a parameter indicating a transmission mode corresponding to the downlink spatial multiplexing and predetermined additional information are received as the configuration information and if the capability information includes the number of MIMO layers for the transmission mode, to determine a bit width for transmitting uplink control information based on the predetermined additional information.

According to the present embodiment, there is provided a user apparatus configured to perform communication with a base station in a mobile communication system that supports downlink spatial multiplexing, including:

transmission means configured to transmit capability information of the user apparatus to the base station;

reception means configured to receive configuration information from the base station;

bit width determination means configured, if a parameter indicating a transmission mode corresponding to the downlink spatial multiplexing and predetermined additional information are received as the configuration information, to determine a bit width of a rank indicator based on the predetermined additional information.

According to the above configuration, the user apparatus can properly determine a bit width of uplink control information.

The predetermined additional information is, for example, the maximum number of layers transmitted from the base station as information to be used for determining a bit width for transmitting the uplink control information. According to this configuration, the user apparatus can properly determine a bit width of uplink control information based on information instructed from the base station.

The predetermined additional information may be a bit width for transmitting the uplink control information. According to this configuration, the user apparatus can properly determine a bit width of uplink control information by directly using information instructed from the base station.

"Means" in the above-mentioned configuration of each apparatus may be replaced with "unit", "circuit", "device" or the like.

The user apparatus UE described in the present embodiment may include a CPU and a memory, and may be realized by executing a program by the CPU (processor), or may be realized by hardware such as hardware circuits including logics of processing described in the embodiment, or may be configured by coexistence of a program and hardware.

The base station eNB described in the present embodiment may include a CPU and a memory, and may be realized by executing a program by the CPU (processor), or may be realized by hardware such as hardware circuits including logics of processing described in the embodiment, or may be configured by coexistence of a program and hardware.

In the above, the embodiment of the present invention has been explained. However, the disclosed invention is not limited to the embodiment. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus and the base station have been explained by using functional block diagrams. However, such an apparatus may be implemented in hardware, software, or a combination thereof.

The software that operates by a processor of the user apparatus according to an embodiment of the present invention and the software that operates by a processor of the base station may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

DESCRIPTION OF REFERENCE SIGNS

UE user apparatus
eNB base station
101 DL signal reception unit
102 UL signal transmission unit
103 RRC management unit
104 soft buffer size determination unit
105 RI bit width determination unit
201 DL signal transmission unit
202 UL signal reception unit
203 RRC management unit
204 scheduling unit
1001 processor
1002 memory
1003 storage
1004 communication device
1005 input device
1006 output device

The invention claimed is:

1. A user apparatus comprising:
a transmitter that transmits capability information of the user apparatus comprising Multiple-Input Multiple-Output (MIMO) capability to a base station;
a receiver that receives configuration information, of a Physical Downlink Shared Channel (PDSCH), that comprises a parameter indicating a transmission mode, a maximum number of MIMO layers, and information on a Physical Uplink Control Channel (PUCCH) from the base station; and
a processor that determines a bit width of a rank indicator based on the maximum number of MIMO layers used for the PDSCH.

2. An uplink control information bit width determination method executed by a user apparatus configured to perform communication with a base station in a mobile communication system, comprising:
- transmitting capability information of the user apparatus comprising Multiple-Input Multiple-Output (MIMO) capability to the base station;
- receiving configuration information, of a Physical Downlink Shared Channel (PDSCH), that comprises a parameter indicating a transmission mode, a maximum number of MIMO layers, and information on a Physical Uplink Control Channel (PUCCH) from the base station; and
- determining a bit width of a rank indicator based on the maximum number of MIMO layers used for the PDSCH.

* * * * *